United States Patent
Gulian

(10) Patent No.: US 10,156,373 B1
(45) Date of Patent: Dec. 18, 2018

(54) THERMAL INTEGRATION OF A CATALYTIC BURNER AND A CARBON DIOXIDE REMOVAL UNIT

(71) Applicant: Franklin J. Gulian, Schwenksville, PA (US)

(72) Inventor: Franklin J. Gulian, Schwenksville, PA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 261 days.

(21) Appl. No.: 15/153,414

(22) Filed: May 12, 2016

Related U.S. Application Data

(60) Provisional application No. 62/162,456, filed on May 15, 2015.

(51) Int. Cl.
| | |
|---|---|
| *B01D 53/04* | (2006.01) |
| *F24F 3/16* | (2006.01) |
| *B60H 3/06* | (2006.01) |
| *B63G 8/36* | (2006.01) |

(52) U.S. Cl.
CPC ........ *F24F 3/1603* (2013.01); *B01D 53/0462* (2013.01); *B60H 3/0608* (2013.01); *B63G 8/36* (2013.01); *B01D 2257/502* (2013.01); *B01D 2257/504* (2013.01); *B60H 2003/0691* (2013.01); *F24F 2003/1628* (2013.01)

(58) Field of Classification Search
CPC ...... F24F 3/1603; B01D 53/0462; B63G 8/36
See application file for complete search history.

(56) References Cited

U.S. PATENT DOCUMENTS

| | | | |
|---|---|---|---|
| 4,522,894 A | 6/1985 | Hwang et al. | |
| 5,656,557 A * | 8/1997 | Hata | C01B 13/0288 422/171 |
| 6,063,515 A | 5/2000 | Epp et al. | |
| 8,197,687 B2 | 6/2012 | Krogue et al. | |
| 8,333,944 B2 | 12/2012 | Constantz et al. | |
| 8,343,671 B2 | 1/2013 | Qi | |
| 9,266,054 B2 | 2/2016 | McKenna et al. | |

OTHER PUBLICATIONS

U.S. Appl. No. 62/162,456, filed May 15, 2015, entitled "Thermal Integration of a Catalytic Burner Unit and a Carbon Dioxide Removal Unit," inventor Franklin J. Gulian.

* cited by examiner

*Primary Examiner* — Sean E Conley
(74) *Attorney, Agent, or Firm* — Howard Kaiser

(57) ABSTRACT

In accordance with exemplary inventive practice, a catalytic system and a temperature swing adsorption system are thermally integrated. The temperature range of the adsorption system is lower than the catalyst operating temperature. Benefits of inventive practice include reduction of total energy consumption and of generated waste-heat. Total energy consumption is reduced by transferring some of the waste-heat generated by the catalytic system into the adsorption system during the sorbent heat-up portion of the sorbent regeneration cycle. The heat is transferred using a thermal reservoir, which accumulates heat from the catalytic apparatus and transfers it to the adsorption apparatus at a later time, and which is repeatedly cycled as the sorbent is cycled. The catalytic system and the adsorption system can be inventively integrated in various ways to reduce the total energy consumed, and/or to modify the sorbent regeneration temperature profile, and/or to obtain an optimum power load profile.

7 Claims, 25 Drawing Sheets

Heat Balances for Catalyst Burner on Submarines for Typical Operation

| | Heating Rates (KW) | Cumulative Heat Over 25 Minutes (MJ) |
|---|---|---|
| Heat Input by HTR1 | 26.6 | 39.9 |
| Heat Removed by AfterCooler | 17.5 | 26.3 |
| Heat Load on AC System | 5.7 | 8.6 |
| Radiated Heat | 2.8 | 4.3 |
| Total Waste-Heat | 26.6 KW | 39.9 MJ |

FIG. 19

Energy Balances for Increasing Power of Water Heater (No Thermal Reservoir)

| | Maximum Power of Water Heater in Stand-Alone ACRU | | | | | | | |
|---|---|---|---|---|---|---|---|---|
| | 20 (KW) | 23 (KW) | 30 (KW) | 40 (KW) | 60 (KW) | 80 (KW) | 100 (KW) |
| Water Heater, HTR-50 (Heat Input) | 22.40 | 23.51 | 24.71 | 25.48 | 26.14 | 26.41 | 26.55 |
| Water Cooler, HX-21 (Heat Output) | 16.45 | 17.03 | 17.14 | 17.15 | 17.15 | 17.15 | 17.15 |
| Sorbent Bed Heat Loss (Heat Output) | 5.63 | 6.36 | 7.23 | 7.94 | 8.60 | 8.89 | 9.05 |
| Sorbent Bed, Accumulated (Heat Output) | 0.69 | 0.71 | 0.71 | 0.71 | 0.71 | 0.71 | 0.71 |
| Total Waste-Heat | 22.40 | 23.51 | 24.71 | 25.48 | 26.14 | 26.41 | 26.55 |
| Average Power (KW) | 14.93 | 15.67 | 16.47 | 16.99 | 17.43 | 17.61 | 17.70 |

All Values in MJ Except Average Power Levels

Heat Loss Coefficient for Sorbent Bed = 250 BTU/hr/°F

Sorbent Bed Heat Capacity = 160 BTU/°F

FIG. 20

Energy Balances for Increasing the Level of Preheat in the Heat Reservoir

(All Values in MJ Except Average Power Levels)

| | Preheat Temperature of Thermal Reservoir (Maximum Power of Water Heater: 23 KW) | | | | |
|---|---|---|---|---|---|
| | No Preheat | 200 °F | 300 °F | 400 °F | 500 °F |
| Water Heater, HTR-50 (Heat Input) | 23.51 | 23.19 | 19.18 | 14.58 | 9.60 |
| Total Energy Put Into Thermal Reservoir (Heat Input) | 0 | 2.33 | 7.76 | 13.29 | 18.84 |
| Energy Lost by Thermal Reservoir (Heat Output) | 0 | 0.99 | 1.37 | 1.70 | 2.00 |
| Net Energy into Thermal Reservoir | 0 | 1.34 | 6.39 | 11.59 | 16.84 |
| Water Cooler, HX-21 (Heat Output) | 17.03 | 17.10 | 17.15 | 17.15 | 17.15 |
| Sorbent Bed Heat Loss (Heat Output) | 6.36 | 7.28 | 8.27 | 8.85 | 9.12 |
| Sorbent Bed, Accumulated (Heat Output) | 0.71 | 0.72 | 0.72 | 0.72 | 0.72 |
| Total Waste-Heat | 23.51 | 25.52 | 26.94 | 27.87 | 28.44 |
| Average Power (KW) | 15.67 | 17.01 | 17.96 | 18.58 | 18.96 |

FIG. 21

Heat Balances for Inventive Configuration A Versus Standalone Systems
(25 Minute Regeneration Cycle)
(All Values in MJ Except Average Power Values)

|  | Stand Alone ACRU and Catalyst Burner | | | Integrated ACRU and Catalyst Burner with 23 KW Water Heater |
|---|---|---|---|---|
|  | Increased Water Heater Power, No Reservoir | | 200 F Preheat, 23 KW Water Heater |  |
|  | 30 KW | 40 KW | | |
| Air Heater, HTR1 (Heat Input) | 39.86 | 39.86 | 39.86 | 40.41 |
| Water Heater, HTR-50 (Heat Input) | 24.71 | 25.48 | 23.19 | 20.81 |
| Thermal Reservoir Preheat (Heat Input) |  |  | 2.33 |  |
| Thermal Energy Lost (Heat Output) |  |  | 0.99 | 1.10 |
| Catalyst Heat Lost (Heat Output) | 4.25 | 4.25 | 4.25 | 4.25 |
| Water Cooler (Heat Output) | 17.14 | 17.15 | 17.10 | 17.14 |
| AfterCooler (Heat Output) | 26.29 | 26.29 | 26.29 | 21.77 |
| Sorbent Bed Heat Loss (Heat Output) | 7.23 | 7.94 | 7.28 | 7.57 |
| T17 Heat (Heat Output) | 8.58 | 8.58 | 8.58 | 8.58 |
| Sorbent Bed Accumulated (Heat Output) | 0.72 | 0.72 | 0.72 | 0.72 |
| Total Waste-Heat | 64.57 | 65.34 | 65.38 | 61.22 |
| Average Power (KW) | 43.05 | 43.56 | 43.59 | 40.81 |

FIG. 22

Heat Balances for Inventive Configuration B versus Standalone Systems
(25 Minute Regeneration Cycle)

| | Stand Alone ACRU and Burner | | Integrated Systems with 23 KW water heater |
|---|---|---|---|
| | 100 KW Water Heater | 500 F Preheat with 23KW Heater | |
| Air Heater, HTR1 (Heat Input) | 39.86 | 39.86 | 51.87 |
| Water Heater, HTR-50 (Heat Input) | 26.55 | 9.60 | 14.24 |
| Thermal Reservoir Preheat (Heat Input) | | 18.84 | |
| Thermal Energy Lost (Heat Output) | | 2.00 | 3.85 |
| Catalyst Heat Lost (Heat Output) | 4.25 | 4.25 | 4.25 |
| Water Cooler (Heat Output) | 17.15 | 17.15 | 17.36 |
| AfterCooler (Heat Output) | 26.29 | 26.30 | 22.14 |
| Sorbent Bed Heat Loss (Heat Output) | 9.05 | 9.12 | 9.10 |
| T17 Heat (Heat Output) | 8.58 | 8.58 | 8.58 |
| Sorbent Bed Accumulated (Heat Output) | 0.72 | 0.72 | 0.72 |
| Total Waste-Heat | 66.41 | 68.30 | 66.11 |
| Average Power (KW) | 44.27 | 45.53 | 44.07 |

FIG. 23

Heat Balances for Inventive Configuration B Versus Standalone Systems
(20 minute Regeneration Cycle)

|  | Stand Alone ACRU and Burner | | Integrated Systems with 23 KW water heater |
|---|---|---|---|
|  | 100 KW Water Heater | 500 F Preheat with 23KW Heater |  |
| Air Heater, HTR1 | 31.90 | 31.89 | 43.17 |
| Water Heater, HTR-50 | 23.13 | 6.55 | 10.51 |
| Thermal Reservoir Preheat |  | 17.96 |  |
| Thermal Energy Lost |  | 1.35 | 2.96 |
| Catalyst Heat Lost | 3.40 | 3.40 | 3.40 |
| Water Cooler | 17.67 | 17.67 | 17.87 |
| AfterCooler | 21.03 | 21.04 | 17.00 |
| Sorbent Bed Heat Loss | 5.71 | 5.77 | 5.75 |
| TI7 Heat | 6.87 | 6.87 | 6.87 |
| Sorbent Bed Accumulated | 0.24 | 0.24 | 0.24 |
| Total Waste-Heat | 55.03 | 56.40 | 53.68 |
| Average Power (KW) | 45.86 | 47.00 | 44.73 |

FIG. 24

Integrated Catalyst Burner / ACRU System, Inventive Configuration C

THERMAL INTEGRATION OF A CATALYTIC BURNER AND A CARBON DIOXIDE REMOVAL UNIT

CROSS-REFERENCE TO RELATED APPLICATIONS

This application claims the benefit of U.S. provisional application No. 62/162,456, filed 15 May 2015, hereby incorporated herein by reference, entitled "Thermal Integration of a Catalytic Burner Unit and a Carbon Dioxide Removal Unit," inventor Franklin J. Gulian.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to catalytic systems and temperature-swing adsorption systems, more particularly to catalytic oxidation systems that operate at higher temperatures than temperature-swing adsorption systems.

The fuel onboard a submarine is the ultimate source of all energy produced and consumed on the submarine. Refueling a nuclear powered submarine is very costly and produces radioactive hazardous waste. The United States Navy seeks to reduce the refueling requirement of its nuclear and non-nuclear submarine fleet. In the nuclear case, an ultimate goal would be to produce a submarine which is fueled once during manufacture with enough fuel to last for the life of the submarine. One way to reduce the fueling requirement on the submarine is to reduce the amount of power that the submarine generates and consumes. Consequently, any modification to any equipment that reduces the amount of energy consumed is beneficial to the US Navy.

U.S. Navy submarines are equipped with devices for removing carbon monoxide (CO), carbon dioxide ($CO_2$), and other contaminants from the air contained in the enclosed space. Catalyst systems and $CO_2$ removal systems are implemented as separate systems onboard a submarine. A catalytic burner (synonymously referred to herein as a catalytic oxidizer) is a device that effects catalyzed chemical reactions so as to break down molecules of hazardous airborne contaminants to convert them to non-hazardous molecules, namely $CO_2$ and water vapor. The catalyst within the burner system must operate at an elevated temperature in the range of ~450-600° F., and the burner system must consume electrical power from the submarine to maintain this catalyst operating temperature. The catalyst burner also generates waste-heat which requires additional energy from the submarine for waste-heat removal. All of this contributes to the overall power consumed on the submarine and the requirement to consume fuel. The $CO_2$ removal unit that is currently onboard submarines is a scrubber system based on an aqueous solution of monoethanol amine (MEA). The scrubber system operates at steady-state wherein $CO_2$ is removed from the air and absorbed into the MEA solution at a low temperature (~70° F.) and subsequently removed from the MEA solution at a higher temperature (~250° F.). The $CO_2$ removal system also consumes energy and generates undesirable waste-heat on the submarine. With the current operating parameters of these systems, there is no way to reduce the total amount of energy consumed and waste-heat generated by combining these systems.

A new carbon dioxide ($CO_2$) removal system based on sorbents, known as the Advanced Carbon Dioxide Removal Unit (ACRU), is being developed by the U.S. Navy. The ACRU represents a type of temperature-swing adsorption system that is propitiously applicable to removal of carbon dioxide from confined environments such as those existing onboard submarines and other vessels. According to the ACRU, adsorption of $CO_2$ occurs at room temperature (~70° F.), and desorption of $CO_2$ occurs at ~180° F. Whereas the liquid MEA system operates at steady-state with the MEA in a continuous loop, the ACRU must cycle two or more sorbent beds between the low adsorption temperature and high desorption temperature in a non-steady state manor. When a sorbent bed must be regenerated, heat input is required to raise its temperature from the adsorption temperature to the desorption temperature. When the sorbent bed must be cooled, heat removal is required.

SUMMARY OF THE INVENTION

In view of the foregoing, an object of the present invention is to provide a methodology of reducing the total power consumption and waste-heat generated onboard submarines.

An exemplary air contaminant removal system in accordance with the present invention includes a heat-producing catalytic oxidation apparatus, a heat-producing temperature-swing adsorption-desorption apparatus, and a heat exchanger that is shared by the catalytic apparatus and the adsorption-desorption apparatus. The catalytic apparatus oxidizes CO and other oxidizable airborne contaminates. The adsorption-desorption apparatus has a separate air inlet and outlet and removes $CO_2$ from a separate portion of ambient air. The catalytic apparatus includes a first heat exchanger, an air heater, and an aftercooler (AC). The temperature-swing adsorption-desorption apparatus includes a sorbent for adsorbing $CO_2$ from ambience-intake air (air taken in from the ambience or environment) and is characterized by a sorbent water loop for alternately heating and cooling the sorbent. A second heat exchanger is shared by the catalytic apparatus and the adsorption-desorption apparatus. The first heat exchanger and the second heat exchanger are different (separate) heat exchangers.

According to a first inventive approach, referred to herein as inventive configuration "A," a quantity of air is taken in from the ambience (environment). The ambience-intake air is heated sequentially by the first heat exchanger and the air heater. The heated air is conducted to and catalyzed by a catalyst. The catalyzed air is conducted back to the first heat exchanger, and is then conducted to the second heat exchanger at a reduced temperature. The catalyzed air is conducted from the second heat exchanger to an aftercooler (AC) and released directly into the ambience. A separate quantity of ambience air is taken in by the inventive system's adsorption-desorption apparatus for removal of $CO_2$ and then released directly into the ambience. In order for the adsorption-desorption apparatus to operate continuously, two or more sorbent beds are required. In the inventive system, the temperature of the sorbent beds is controlled with a water loop, and the second heat exchanger acts as a heat reservoir in the sorbent water loop to transfer heat from the catalytic apparatus to the inventive system's adsorption-desorption apparatus.

According to a second inventive approach, referred to herein as inventive configuration "B," a quantity of air is taken in from the ambience. The ambience-intake air is heated sequentially by the first heat exchanger and the air heater. The heated air is conducted to and catalyzed by a catalyst. The catalyzed air is conducted to the second heat exchanger. The catalyzed air is conducted from the second heat exchanger to the first heat exchanger at a reduced temperature, and is then conducted from the first heat exchanger to an aftercooler (AC) and released directly into the ambience. A separate quantity of ambience air is taken in by the system's adsorption-desorption apparatus for removal of $CO_2$ and then released directly into the ambience. The second heat exchanger acts as a heat reservoir in the sorbent water loop to transfer heat from the catalytic apparatus to the inventive system's adsorption-desorption apparatus.

Exemplary inventive practice effects thermal integration of a catalytic burner and a carbon dioxide removal unit (CRU). For instance, an exemplary application of the present invention provides for thermal integration of a catalyst burner and an Advanced Carbon Dioxide Removal Unit (ACRU) such as may be used onboard a United States submarine. In the current U.S. Navy Fleet, the catalyst burner system and the MEA-based carbon dioxide removal system are standalone, nonintegrated systems.

Advantageously, exemplary inventive practice recovers waste heat from a catalyst system for use in a sorbent system. A premise of the present invention is the favorability of recovering waste heat from the catalyst system for use in the sorbent system, thereby reducing the total amount of energy consumed on the submarine. The present invention is founded in part on its recognition of the benefits of integrating catalyst and sorbent systems so as to use, in the sorbent system, the waste heat from the catalyst.

In submarine applications, for instance, an inventive system may be implemented for removing contaminants from onboard air. An inventive system of this kind combines a contaminant-removing catalytic heat-producing oxidizing subsystem and a heat-producing contaminant-removing temperature-swing adsorbent-desorbent subsystem in such a way as to significantly reduce the total amount of heat produced and energy consumed, thereby increasing overall thermal efficiency.

The present invention, as exemplarily embodied, features an integration of a catalyst burner (catalyst oxidizer) apparatus and a temperature-swing adsorption apparatus. More specifically, some examples of inventive practice feature integration of a catalyst burner and an ACRU. There are at least three preferred modes of practice of the present invention. Three inventive modes of practice are referred to herein, respectively, as inventive configuration "A," inventive configuration "B," and inventive configuration "C." As a general guideline of inventive practice, configuration A and configuration B will each be more beneficial than configuration C for most applications of the present invention.

The catalytic burner and the carbon dioxide removal unit (e.g., ACRU) can be inventively integrated in various ways. Inventive integration according to configuration A reduces the total amount of waste-heat generated in an enclosed space (e.g., onboard a submarine), and produces the optimum electrical load profile for the combined burner and ACRU systems without significantly changing the sorbent regeneration temperature profile. Inventive integration according to configuration B is beneficial if improvement is desired in the carbon dioxide ($CO_2$) sorbent regeneration temperature profile of the stand-alone ACRU; in particular, inventive configuration B offers reduced waste-heat and an improved electrical load profile with a rapid sorbent heating rate.

In both inventive configuration A and inventive configuration B, a second heat exchanger (designated "HX2" in exemplary embodiments described herein) acts as a thermal reservoir (heat reservoir) in the following sense. Heat is transferred from the catalytic burner into the HX2 during the period of time when heat to the sorbent bed is generally not needed. Heat is then transferred from the HX2 to the $CO_2$ removal unit's sorbent when heat to the sorbent is needed. Overall, there is a net transfer of heat from the catalytic burner to the ACRU. According to exemplary practice inventive configuration A, this net transfer of heat results most notably in a lower total amount of heat generated for the integrated systems. According to exemplary practice of inventive configuration B, this net transfer of heat results most notably in a faster heating profile for the sorbent.

According to exemplary practice of inventive configuration C, there is a net transfer of heat from the ACRU to the catalyst burner, which occurs during sorbent cool down. The HX2 does not act as a thermal reservoir in this case, because most heat transferred into the HX2 during the sorbent cool down period is immediately transferred into the catalytic burner system. Inventive configuration C may be beneficial insofar as saving energy, but the total energy saving may not be great.

Some embodiments of the present invention provide a mathematical model with graphical user interface (GUI) for an integrated catalyst-oxidizer-and-fixed-bed sorbent system. For instance, the present inventor wrote an embodiment of a computer program to enable evaluation and optimization of a system including: (i) a catalyst that operates at an elevated temperature; and, (ii) a sorbent that operates over a range of temperatures that is lower than the catalyst's operating temperature.

Other objects, advantages, and features of the present invention will become apparent to the skilled artisan from the following description of exemplary embodiments of the present invention, when considered in conjunction with the accompanying drawings.

BRIEF DESCRIPTION OF THE DRAWINGS

The present invention will now be described, by way of example, with reference to the accompanying figures, wherein:

FIG. 19 is a table showing, by way of example, heat balances for a carbon monoxide and hydrogen catalytic type catalyst burner on submarines, for typical operation of a submarine.

FIG. 20 is a table showing, by way of example, energy balances for increasing power of a water heater in a standalone ACRU being developed (no thermal reservoir).

FIG. 21 is a table showing, by way of example, energy balances for increasing the level of preheat in the heat reservoir in a standalone ACRU being developed. All values are in MJ except for average power levels.

FIG. 22 is a table showing, by way of example, heat balances for inventive configuration A versus stand-alone systems being developed with sorbent regeneration temperature profiles shown in FIG. 11.

FIG. 23 is a table showing, by way of example, heat balances for inventive configuration B versus stand-alone systems being developed with similar regeneration temperature profiles shown in FIG. 14 (25-minute regeneration cycle).

FIG. 24 is a table showing, by way of example, heat balances for inventive configuration B versus stand-alone systems being developed with similar regeneration temperature profiles (20-minute regeneration cycle).

DESCRIPTION OF EXEMPLARY
EMBODIMENTS OF THE INVENTION

Figure 1:
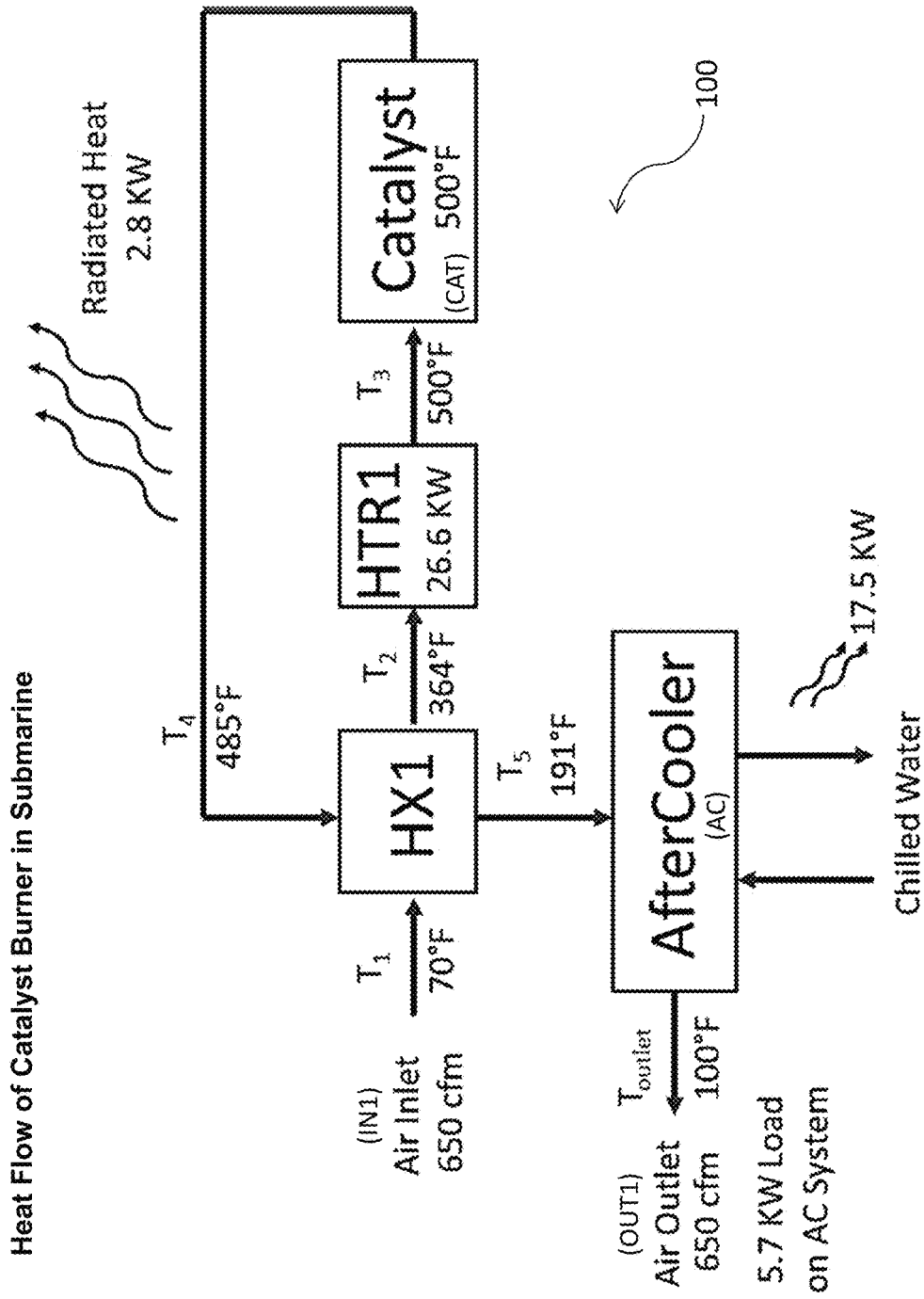
FIG. 1 is a block diagram illustrating, by way of example, heat flow in a conventional standalone catalyst burner onboard a Navy submarine.

Referring now to FIG. 1, U.S. Navy submarines currently implement a heat-producing catalytic apparatus 100 that is standalone. FIG. 1 is a block diagram representing the heat flow in the standalone catalyst burner 100. During typical operation, ambient air (650 CFM) is taken in from the submarine ventilation system at ~70° F. and heated to ~364° F. as it passes through a heat exchanger, designated herein "HX1." The oxidation catalyst device CAT operates at 500° F., and the electric heater (HTR1) is required to provide 26.6 KW of heat.

Approximately 2.8 KW of heat is radiated to the environment. This causes a 15° F. drop in the air temperature in the ductwork. The treated air at 485° F. passes again through heat exchanger HX1, where the temperature is reduced to 191° F. The aftercooler reduces the air temperature to 100° F. so that it can be returned to the submarine ventilation system. The aftercooler requires chilled water from the submarine.

The temperatures $T_2$ and $T_5$, respectively, of streams 2 and 5, are based on operation of the heat exchanger HX1 with a heat transfer value (UA) of 1585 BTU/hr/° F. As the heat exchanger HX1 ages or operates at a lower efficiency, the temperature $T_2$ of stream 2 will decrease and the temperature $T_5$ of stream 5 will increase. This will require increased power from HTR1 to maintain the catalyst temperature.

Cooling the air stream from 191° F. to 100° F. requires a heat removal rate of 17.5 KW. The aftercooler AC removes this heat from the air stream by transferring it to the chilled water system of the submarine. As illustrated in FIG. 19, this 17.5 KW becomes waste-heat. The remaining heat (5.7 KW), corresponding to the 100° F. aftercooler outlet temperature relative to the 70° F. inlet temperature, is also considered waste-heat and is ultimately removed by the submarine air conditioning system. The total amount of waste-heat is equal to the sum of these (heat removed by the chilled water system, and heat removed by the air conditioning system) and the radiated heat, and is equal to the amount of heat generated by the air heater (HTR1).

Over a 25-minute period, the catalyst burner generates 39.9 MJ of heat, which ultimately becomes waste-heat on the submarine. The heat generated by the electronic and mechanical systems, such as running the fan, is minor and negligible. Furthermore, heat from these sources would also be present in an exemplary embodiment of an inventive integrated system, so their contributions would cancel.

With reference to FIG. 2 through FIG. 8, a temperature-swing adsorption-desorption apparatus 200 that is standalone is being developed for use on some U.S. Navy submarines. More specifically, the Navy is developing an advanced carbon dioxide removal unit (ACRU) 200 that is a standalone unit. The standalone ACRU is based on a temperature-swing sorbent and is cycled between two temperatures for adsorption and desorption, respectively. That is, the standalone ACRU is a temperature-swing adsorption-desorption component that includes a sorbent device and that is characterized by a sorbent water loop for alternately heating and cooling the sorbent.

Figure 2:
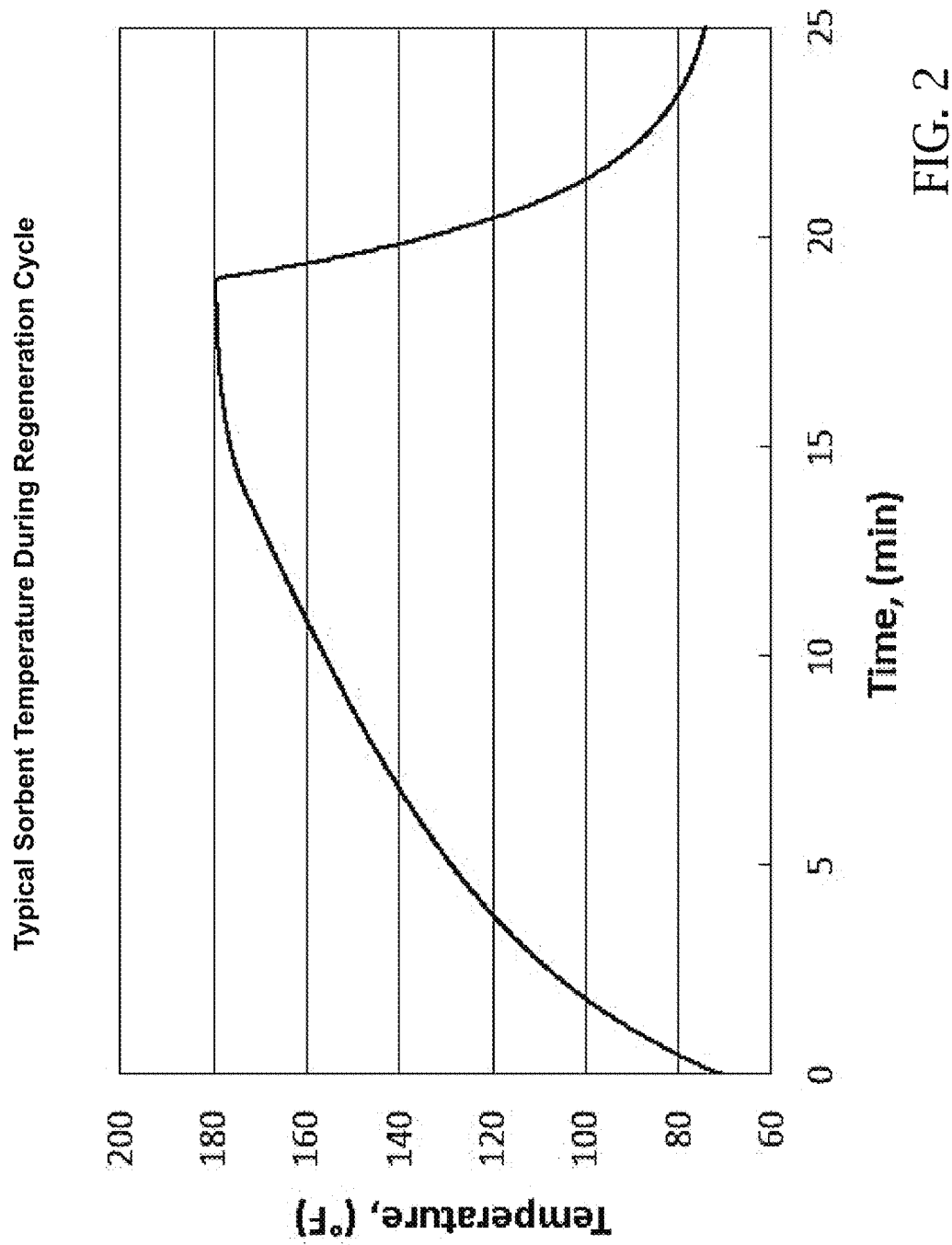
FIG. 2 is a graph illustrating, by way of example, sorbent temperature during the regeneration cycle of a conventional standalone ACRU being developed for a Navy submarine.

The sorbent is cycled between a lower temperature (for adsorption) and a higher temperature (for desorption). The adsorption process occurs at the lower temperature, ~70° F., for 25 minutes when the bed saturates. The temperature during the regeneration cycle is shown in FIG. 2. The heating (desorption) portion occurs during the first 19 minutes, and the cool-down period is in the final 6 minutes of the cycle. Because the standalone ACRU being developed has only two sorbent beds that are continually cycled, the duration of the regeneration cycle cannot exceed the duration of the adsorption process.

Figure 3:
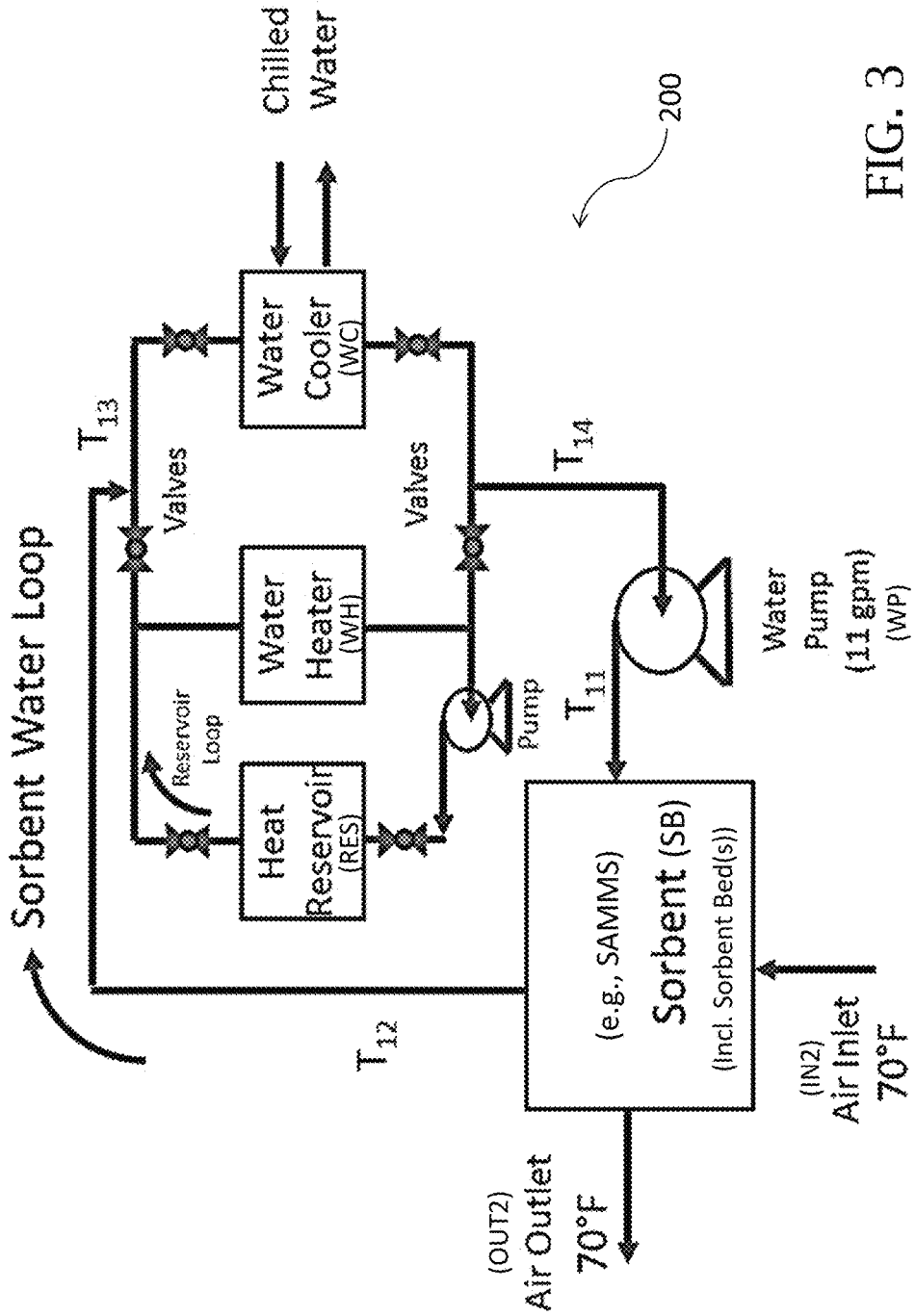
FIG. 3 is a block diagram illustrating, by way of example, the main components of the water system used to heat and cool the sorbent beds of a conventional standalone ACRU being developed for a Navy submarine.

The sorbent device SB includes at least one sorbent bed. For instance, sorbent device SB includes two sorbent beds wherein, on a continuous basis, at least one sorbent bed is in adsorption mode/cycle and at least one sorbent bed is in regeneration mode/cycle. FIG. 3 shows the primary components of the water system used to heat and cool the sorbent beds SB of the ACRU. Valves are controlled such that both sorbent beds are cycled with one bed in the adsorption mode while the other bed is in the regeneration cycle. When a sorbent bed enters the regeneration cycle, circulating water is heated by the water heater WH and passes through a sorbent SB. An example of a $CO_2$ sorbent that may be implemented as sorbent SB in inventive practice is the SAMMS™ (Self-Assembled Monolayers on Mesoporous Supports®) sorbent. Many other $CO_2$ sorbents may be suitable for inventive practice. The water cooler WC is isolated from this bed.

If the heat reservoir RES is used, water is also circulated through it to transfer stored heat from the reservoir RES to the sorbent bed (SB). When the sorbent is cooled during the regeneration cycle, the water passing through the sorbent SB is switched to the water cooler WC, and the water heater WH and heat reservoir are isolated from this bed. If the heat reservoir RES is being used, water is circulated through the water heater WH and reservoir RES to accumulate heat for the next regeneration cycle. The current ACRU uses the heat reservoir. The terms "heat reservoir," "thermal reservoir," and "preheater" are used interchangeably herein.

The sorbent system performance is optimized by maximum saturation and complete regeneration on each cycle. Maximum saturation is achieved by bed design, operational parameters, and continuing the adsorption process until the breakthrough concentration exceeds a design limit. In practice, adsorption does not continue to the breakthrough point, to provide reserve capacity to compensate for sorbent variability and deterioration.

Complete regeneration is obtained by maintaining the sorbent at the desorption temperature until all adsorbate is removed. In general, the capacity of an adsorption system will increase if the sorbent can be cycled faster. This, in turn, for a system with only two sorbent beds, requires that the duration of the regeneration cycle be reduced to match the adsorption cycle. The duration of the regeneration cycle limits the cycling rate in practically all continuous adsorption systems.

Figure 4:
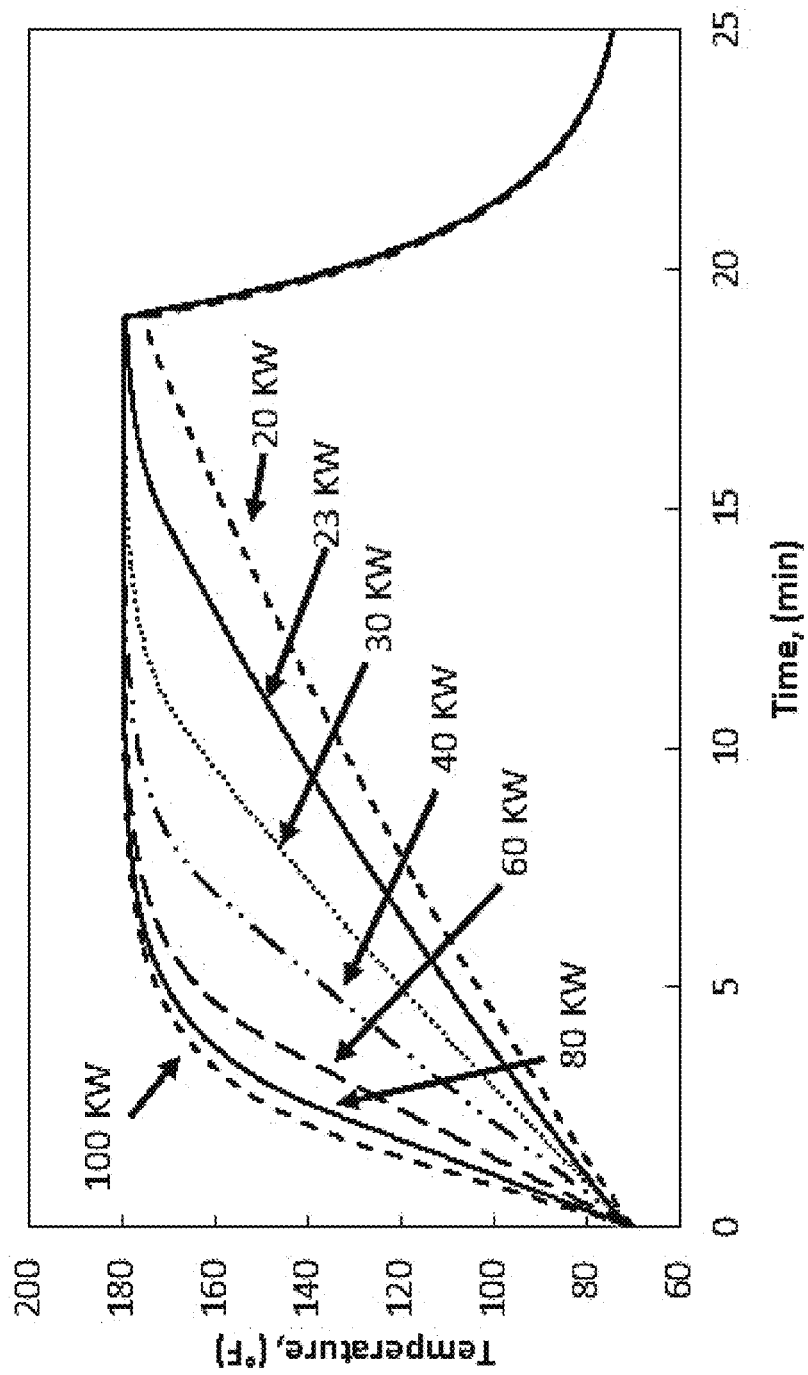
FIG. 4 is a graph illustrating, by way of example, estimated sorbent temperature profiles for various power levels of the water heater of a conventional standalone ACRU being developed for a Navy submarine, when the heat reservoir (preheater) is not in use.

FIG. 4 shows the estimated sorbent temperature profiles during the regeneration cycle for the ACRU for various power levels of the water heater when the heat reservoir is not used. A heating power of 20 KW cannot heat the sorbent to the regeneration temperature (180° F.) and cannot be used.

The curve for 23 KW is shown because the ACRU heater operates at this level during most of the cycle. As the power of the water heater is increased, the sorbent heats faster. As described hereinabove, faster heating rates provide more time at the desorption temperature to facilitate complete desorption. Furthermore, a faster heating rate would allow the duration of the regeneration cycle to be shortened, because the desorption would be complete before the 19 minute point.

Figure 5:
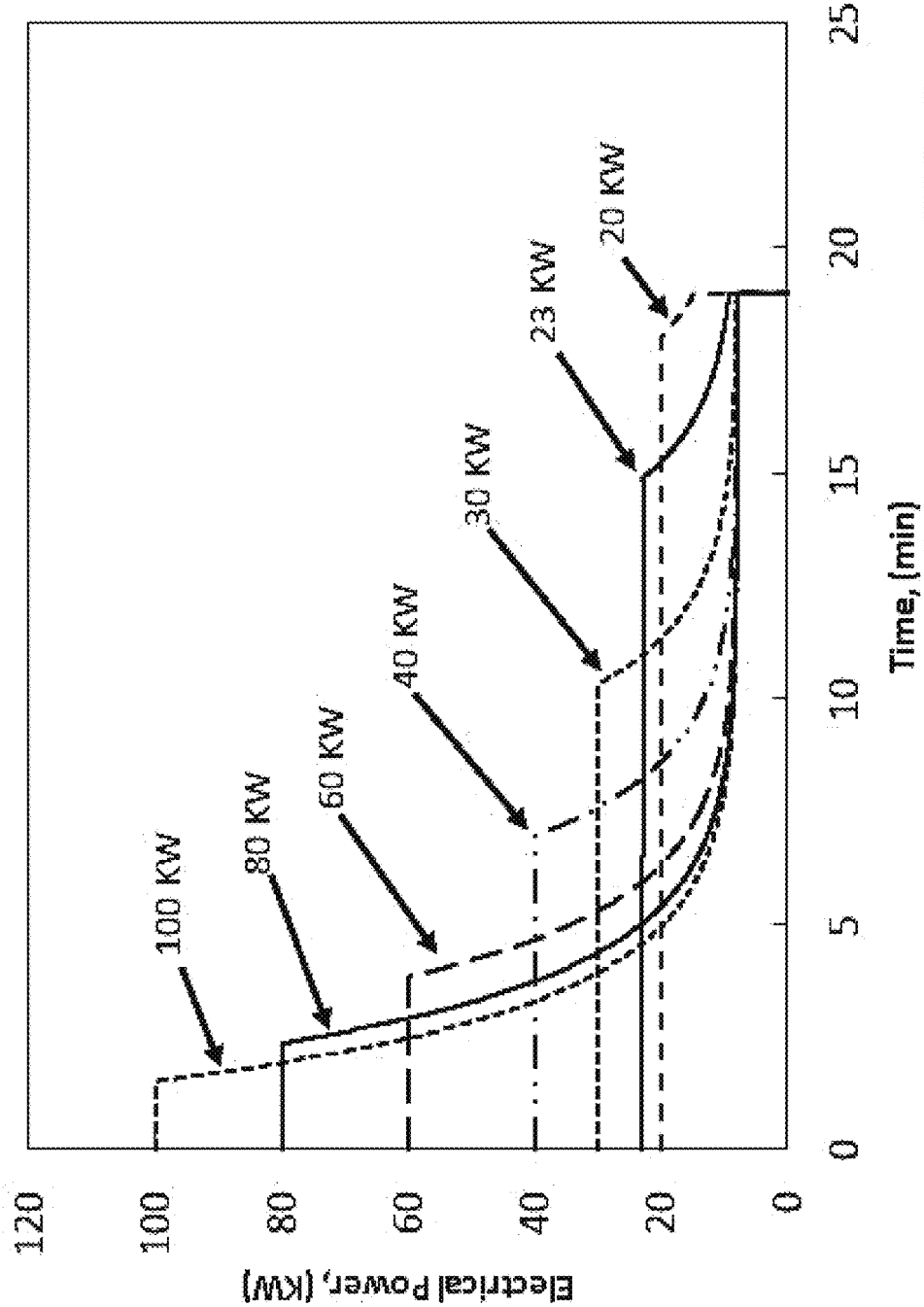
FIG. 5 is a graph illustrating, by way of example, electrical load profiles of the water heater of a conventional standalone ACRU being developed for a Navy submarine, when the heat reservoir (preheater) is not in use.

FIG. 5 is a graph illustrating electrical load requirements of the water heater of a conventional standalone ACRU being developed for a Navy submarine. A significant drawback to increasing the power of the water heater is that it would cause undesirable electrical load leveling problems for the submarine. FIG. 5 shows the electrical load requirements of the water heater. Although the more powerful water heaters draw a larger amount of electrical power over a proportionately shorter time period, the electrical distribution system must be designed for the maximum power. This increases the size, weight, and cost of the electrical system and places a more non-uniform load on the submarine generators. Consequently, increasing the power of the water heater may not be appropriate for submarine systems.

Figure 6:
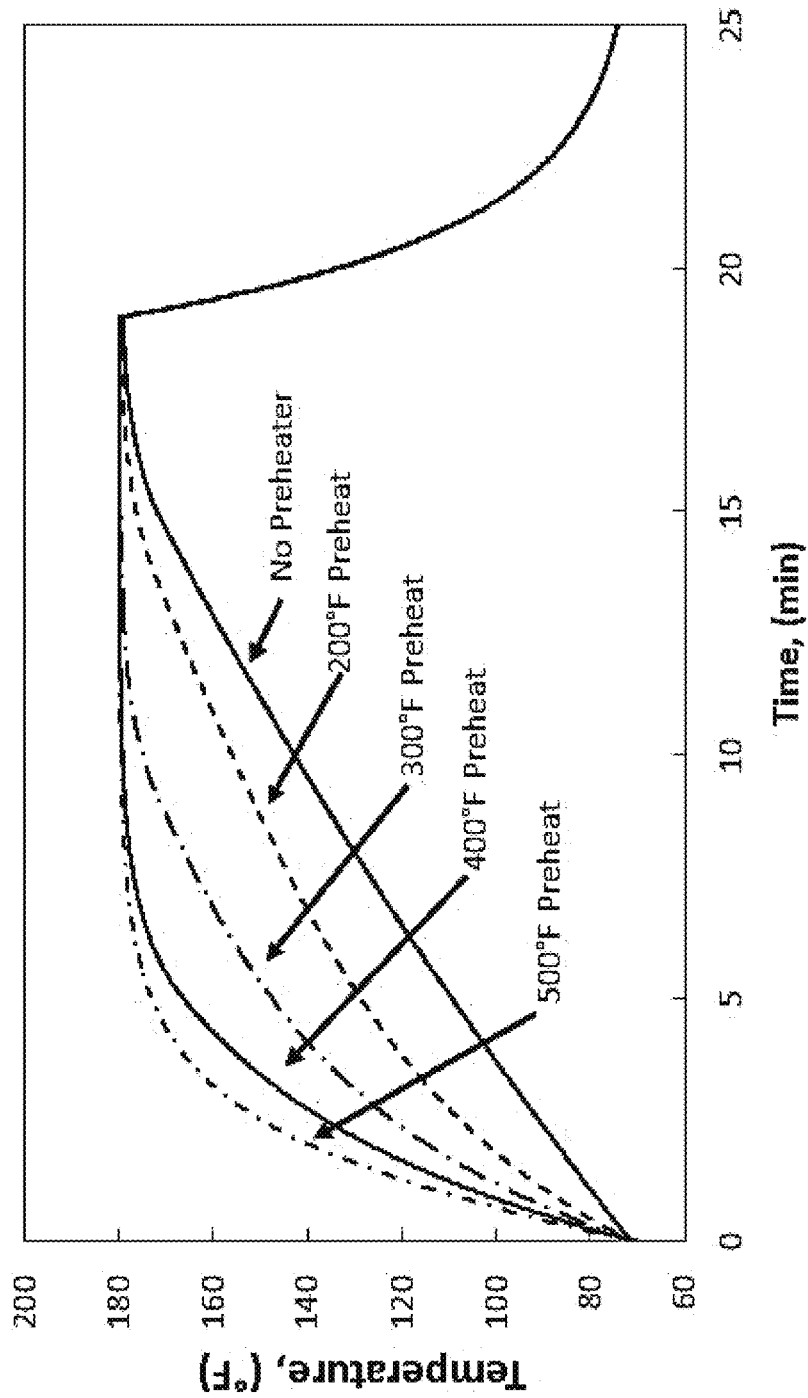
FIG. 6 is a graph illustrating, by way of example, expected sorbent temperature profiles for various levels of preheat, with respect to the heat reservoir (preheater) of a conventional standalone ACRU being developed for a Navy submarine.

FIG. 6 illustrates the expected sorbent temperature profiles for various levels of preheat when the heat reservoir of a conventional standalone ACRU is used. Shown in FIG. 6 are the expected sorbent temperature profiles for the ACRU with various levels of preheat for the heat reservoir. The current ACRU uses the water heater to provide heat for the reservoir so the maximum preheat temperature cannot exceed ~212° F. in a non-pressurized system. However, the ACRU could easily be modified, in accordance with the present invention, such that the heat reservoir is heated electrically to obtain the higher levels of preheat.

The water heater operates at 23 KW in all preheat cases shown in FIG. 6. Higher levels of preheat lead to faster sorbent heating profiles. Lower values of preheat (200° F.) produce a burst effect at the beginning of the temperature profile and a final heating rate determined by the power of the water heater. These estimations are based on a heat reservoir where the amount of heat stored (MJ) is proportional to the preheat temperature. The heat capacity for the heat reservoir is 50 BTU/° F.

Figure 7:
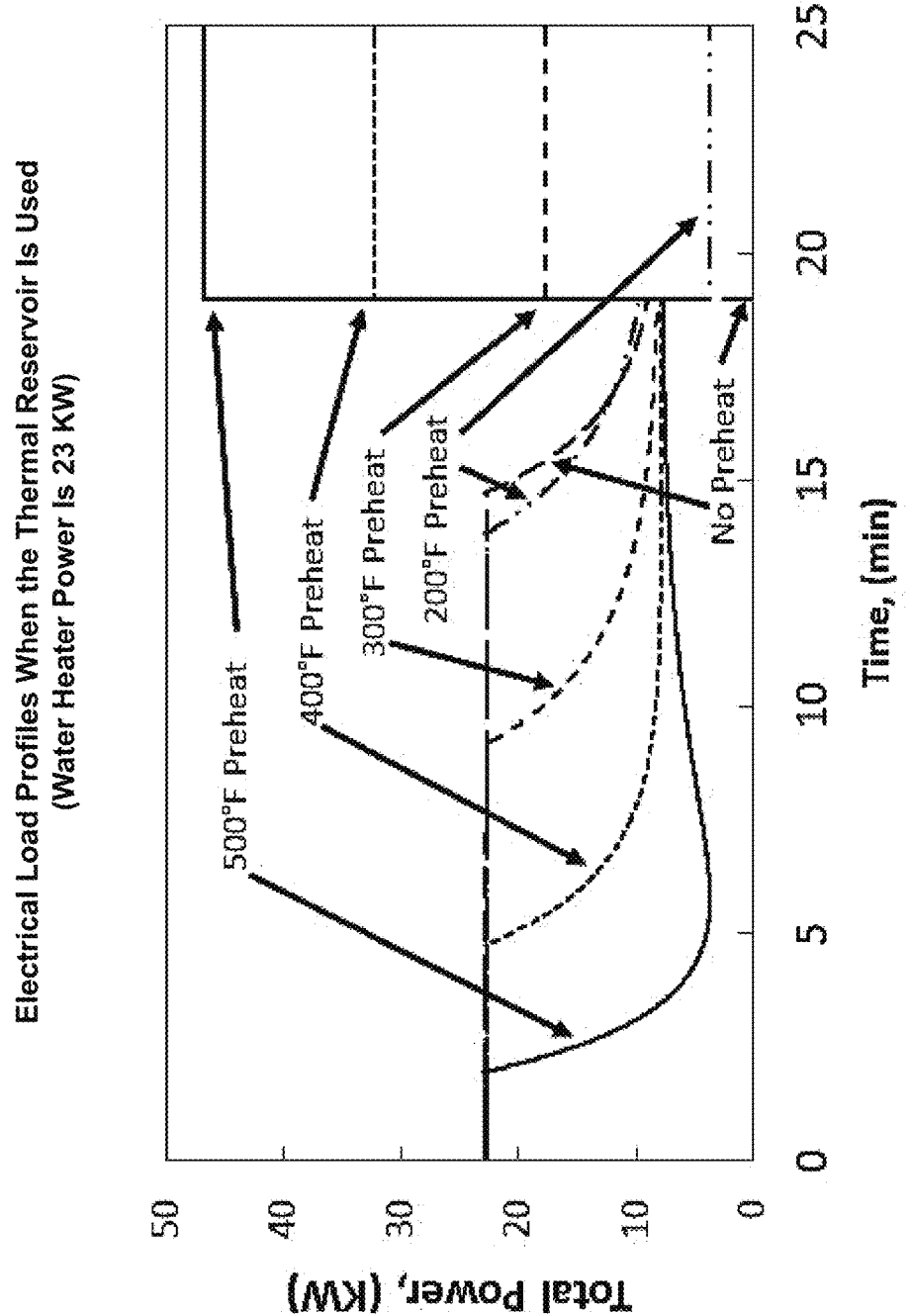
FIG. 7 is a graph illustrating, by way of example, improvement of electrical load profiles through use of the heat reservoir of a conventional standalone ACRU being developed for a Navy submarine.

FIG. 7 illustrates that using the preheater (heat reservoir) has the effect of reducing the electrical load leveling problem described hereinabove. When the preheater is not used, the electrical load is 23 KW for the first ~15 minutes of the cycle (the power tapers down as the sorbent approaches the set point temperature), and then decreases to zero for the final 6 minutes. When the preheater is heated to 500° F., the water heater uses 23 KW for only the first ~2.5 minutes, because the sorbent quickly approaches the setpoint temperature. During the cool down period, a larger amount of electrical power is required to preheat the heat reservoir to the final temperature (500° F. in this case).

Total heat balances for a 25-minute cycle for the scenarios of increased water heater power and usage of the heat reservoir are shown in FIG. 20 and FIG. 21, respectively. For FIG. 20, the water heater is the only heat input, and all others are heat outputs. Thermodynamically, the heat input equals the heat output, and any minor discrepancies are due to the accuracy of the calculations. For the cases of increased water heater power, all heat is provided by the water heater during the heating period. Higher power water heaters cause the sorbent to heat faster which then increases the amount of heat lost through the thermal insulation (sorbent bed heat loss). This amount of lost heat is proportional to the area under the sorbent temperature curve, and the water heater must provide additional heat to compensate.

The heat removed by the water cooler is lower in the 20 KW case because the sorbent did not reach its full desorption temperature. The accumulated heat loss is a consequence of the bed not cooling completely to ~70° F. by the end of the regeneration cycle. This heat is removed by the air that flows through the sorbent during the next adsorption cycle. All heat generated by the water heater eventually becomes waste-heat on the submarine. All values are in megajoules (MJ) except the average power levels, which are in kilowatts (KW).

Figure 8:
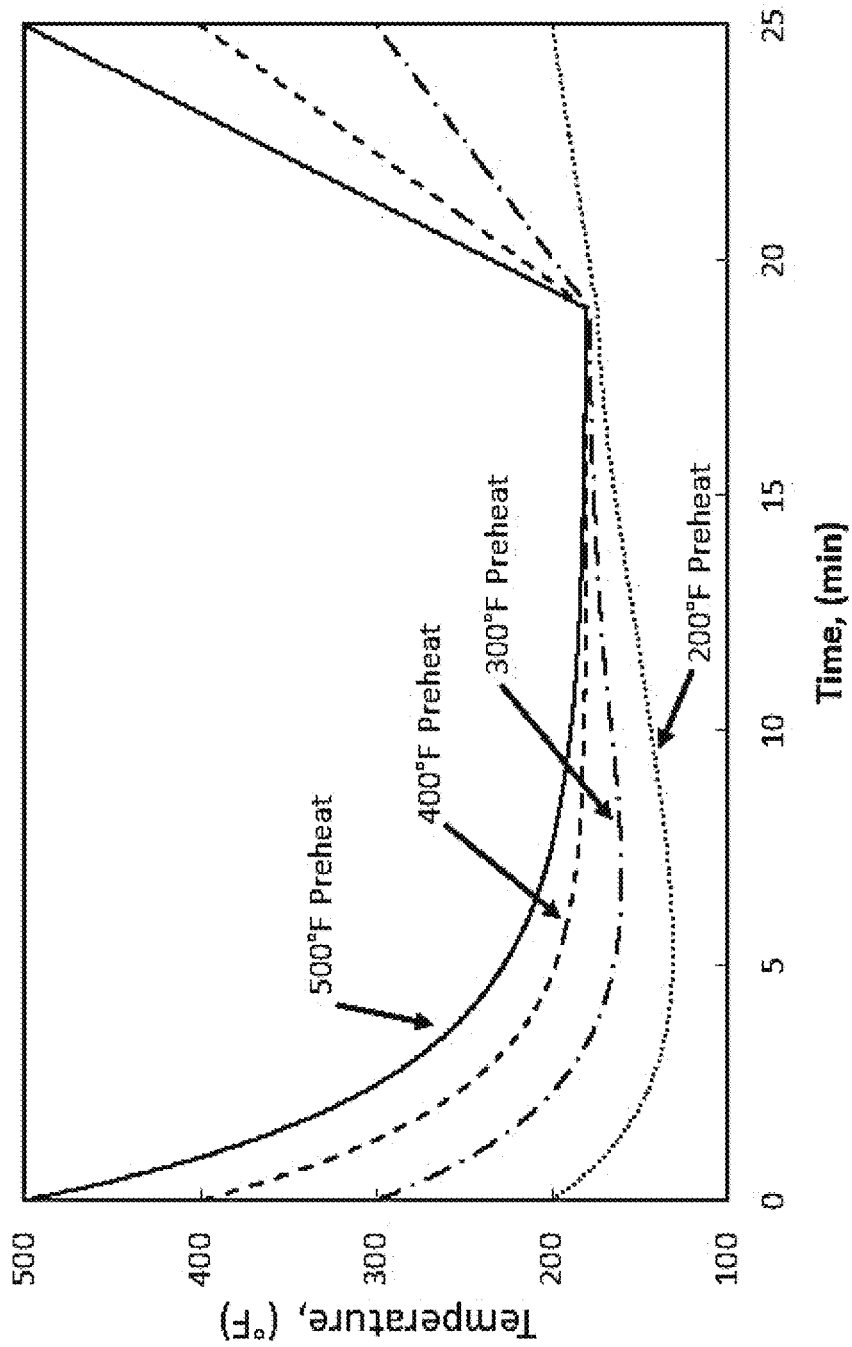
FIG. 8 is a graph illustrating the temperature profile of the heat reservoir during the sorbent regeneration cycle of a conventional standalone ACRU being developed for a Navy submarine.

FIG. 8 is a graph illustrating the temperature profile of the heat reservoir in a conventional ACRU. Heat loss from the heat reservoir is proportional to the area between this temperature profile and the ambient temperature. The energy balances for preheat cases have heat flows associated with the heat reservoir. As shown in FIG. 8, the heat loss from the heat reservoir is proportional to the area under its temperature profile (FIG. 8); accordingly, additional heat must be added to the reservoir to compensate for this loss, as shown in FIG. 21. The net heat input to the heat reservoir is shown in FIG. 21. The total heat generated increases with increasing levels of preheat because the sorbent heats faster and results in increased amounts of heat loss through the thermal insulation. The thermal capacity of the heat reservoir is 50 BTU/° F. All heat generated becomes waste-heat on the submarine.

As exemplified by the below-described inventive configurations "A," "B," and "C," in a preferred applicative sphere inventive practice provides for a thermally efficient combination of two separate air contaminant removal systems for enclosed spaces, viz., a heat-producing catalytic system and a temperature-swing adsorption-desorption system.

Figure 9:
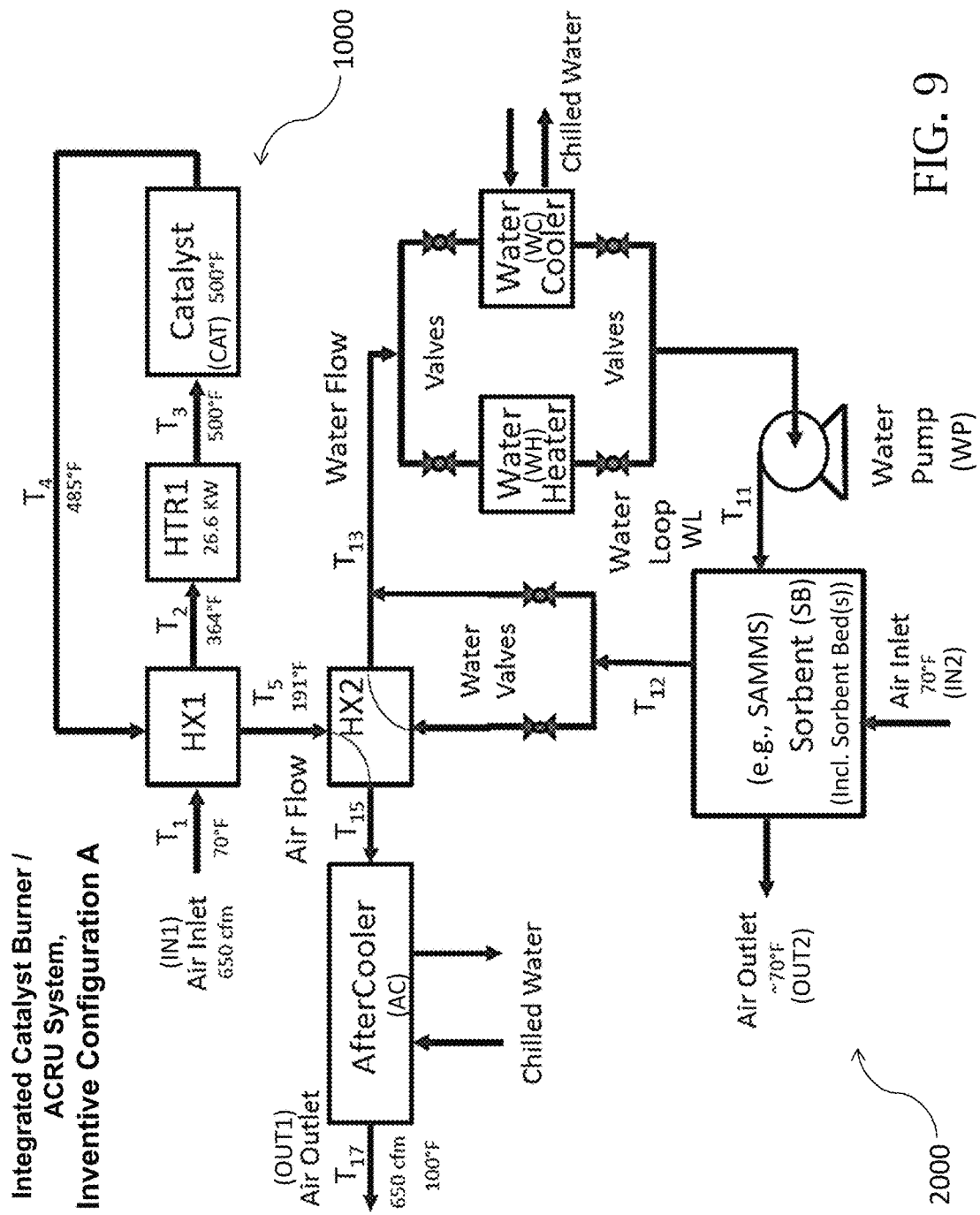
FIG. 9 is a block diagram illustrating, by way of example, practice of configuration "A" in accordance with the present invention.
Figure 13:
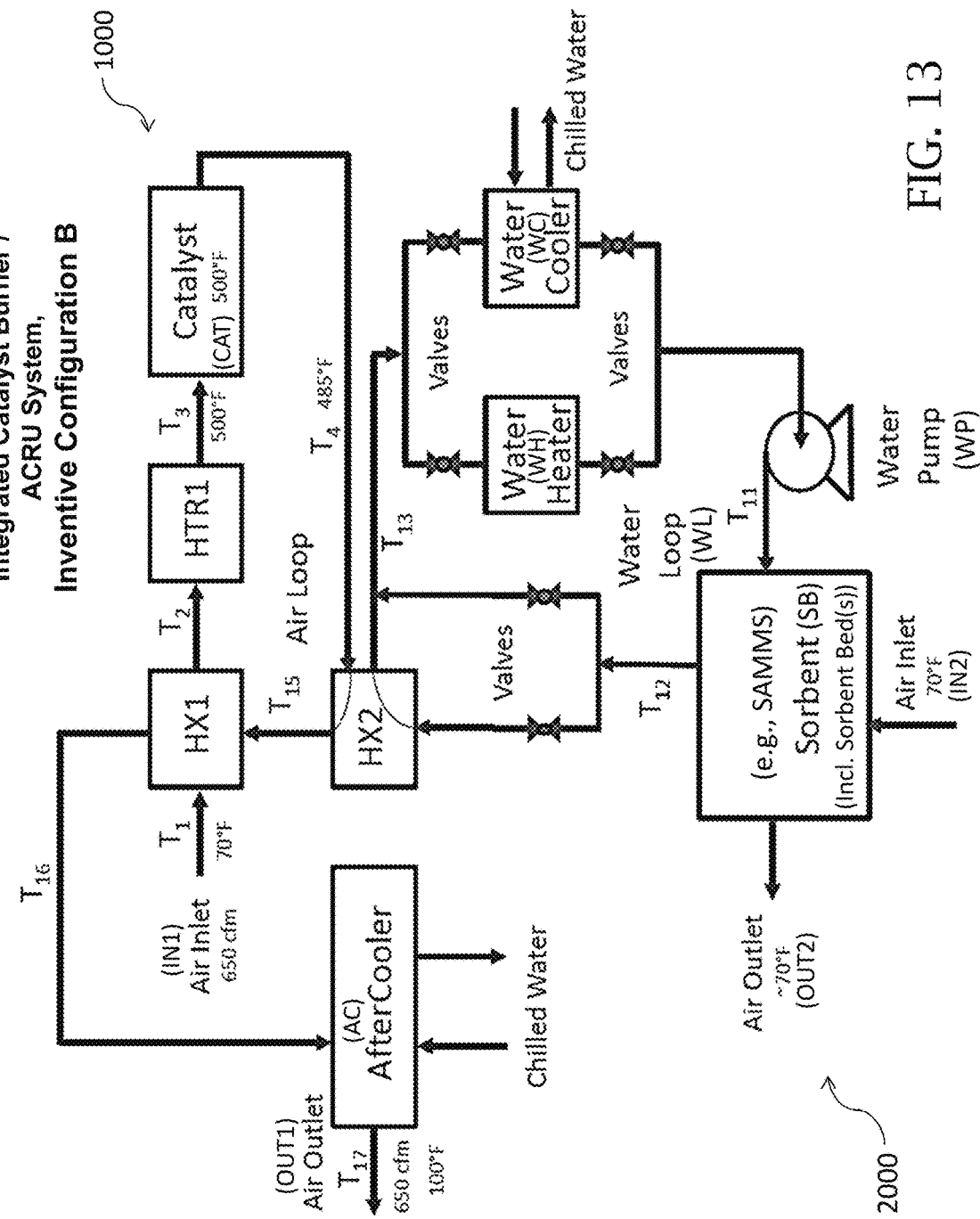
FIG. 13 is a block diagram illustrating, by way of example, practice of configuration "B" in accordance with the present invention.

As illustrated in FIGS. 9 and 13, respectively, inventive configurations A and B have certain elements in common. According to either inventive configuration A or inventive configuration B, a thermally active electromechanical system comprises a heat-producing catalytic burner (oxidizer) component 1000, a heat-producing temperature-swing adsorption-desorption component 2000, and a second heat exchanger HX2. Second heat exchanger HX2 is associated with both the heat-producing catalytic burner component 1000 and the heat-producing temperature-swing adsorption-desorption component 2000.

Heat-producing catalytic component 1000 includes a first heat exchanger HX1, a heater HTR1, a catalyst device CAT, an aftercooler AC, a first air inlet IN1, and a first air outlet OUT1. Heat-producing temperature-swing adsorption-desorption component 2000 includes a water heater WH, a water cooler WC, a water pump WP, a sorbent device SB, a second air inlet IN2, and a second air outlet OUT2. In temperature-swing adsorption-desorption component 2000, a sorbent water loop WL alternately heats and cools sorbent SB. Sorbent SB is cycled between a lower temperature (for adsorption) and a higher temperature (for desorption).

First air inlet IN1 takes in air from the environment to flow to first heat exchanger HX1. Second air inlet IN2 takes in air from the environment to flow to sorbent SB. First air outlet OUT1 releases air from aftercooler AC to flow into the environment. Second air outlet OUT2 releases air from sorbent SB to flow into the environment.

Inventive configurations A, B, and C, respectively, are further described hereinbelow.
Inventive Configuration A Reference is now made to FIGS. 9 through 12 and 22. As illustrated in FIG. 9, air is taken in from the environment (ambience) via air inlet IN1 by heat-producing catalytic component 1000. This ambient air taken in by catalytic component 1000 is heated by first heat exchanger HX1, further heated by heater HTR1, conducted to and catalyzed by catalyst CAT, conducted to first heat exchanger HX1, and conducted to second heat exchanger HX2. The catalyzed air that is conducted to second heat exchanger HX2 is conducted to aftercooler AC and released into the environment via air outlet OUT1. In addition, air is taken in from the environment by heat-producing temperature-swing adsorption-desorption component 2000. This ambient air taken in by adsorption-desorption component 2000 enters sorbent SB via air inlet IN2, passes through sorbent SB, and exits sorbent SB via air outlet OUT2. Second heat exchanger HX2 acts as a heat reservoir in sorbent water loop SB.

FIG. 9 shows an embodiment of an integrated catalyst burner/ACRU system in accordance with configuration A of the present invention. The catalyst burner's first heat exchanger is designated "HX1," similarly as HXI is depicted in FIG. 1. As illustrated in FIG. 9, the inventive configuration A system transfers heat from the catalyst burner to the ACRU through a second heat exchanger, designated herein "HX2." According to exemplary inventive practice, HX2 is essentially an air/water heat exchanger. All of the catalyzed air is conducted from the first heat exchanger HX1 to the second heat exchanger HX2 and then to the aftercooler AC.

The burner portion of the catalyst burner operates at steady-state and provides a continuous supply of ~191° F. air to HX2. At the beginning of a sorbent regeneration cycle, HX2 is at ~191° F., and the ACRU portion of the system behaves similarly to the heat reservoir case above with the heat reservoir heated to 191° F. instead of 200° F. Practically speaking, this discrepancy between 191° F. and 200° F. represents a minor difference. The maximum power of the water heater is 23 KW, but the actual power tapers off as the sorbent reaches its setpoint.

Figure 10:
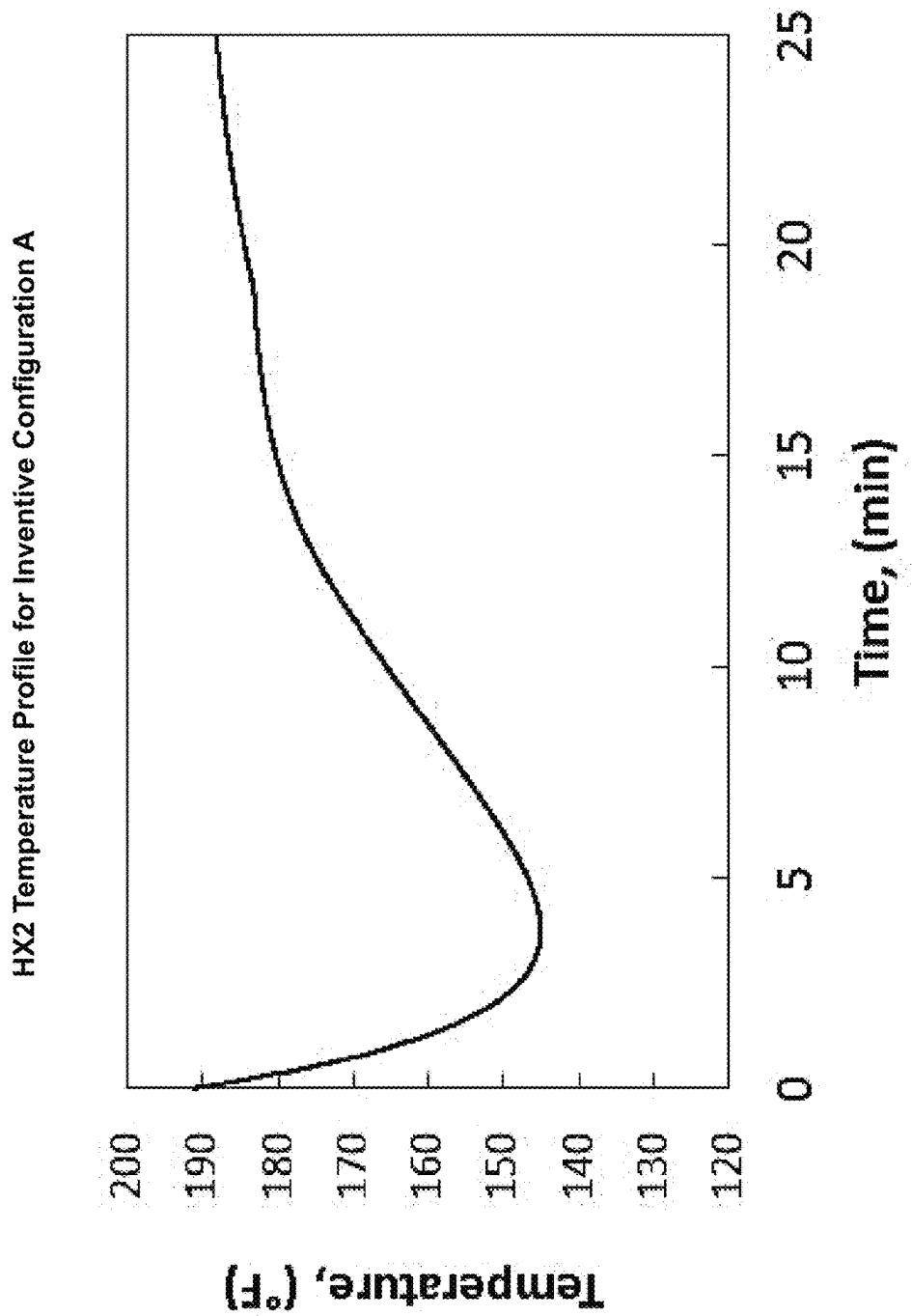
FIG. 10 is a graph illustrating, by way of example, a temperature profile of the second heat exchanger (HX2) in accordance with inventive configuration A.

A main feature of system integration according to the inventive configuration A example shown in FIG. 9 is that the energy to heat the heat reservoir is obtained from the air in stream 5, also shown in FIG. 1. This inventively obtained energy represents "free" energy because this heat would otherwise have been wasted by the aftercooler AC of the catalytic burner in conventional standalone practice, as exemplified in FIG. 1. The continued flow of 191° F. air through second heat exchanger HX2 for the duration of the desorption period (19 minutes) helps compensate for heat losses in the ACRU portion of the inventive system. When the desorption period ends (19 minute point), the water is diverted around heat exchanger HX2, and the temperature of heat exchanger HX2 recovers. Heat exchanger HX2 operates as a heat reservoir with a temperature profile such as shown in FIG. 10, and has a heat capacity of 50 BTU/F.

Figure 11:
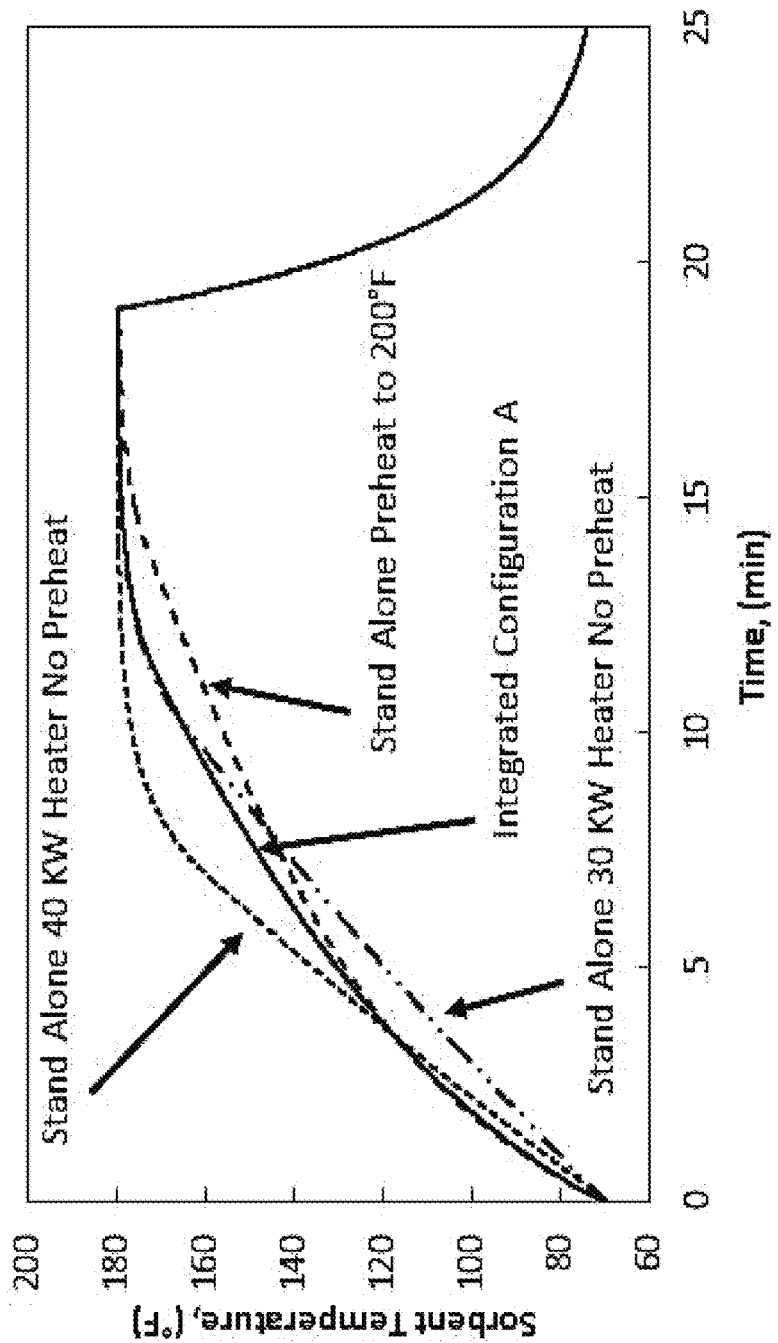
FIG. 11 is a graph illustrating, by way of example, sorbent temperature profiles in accordance with inventive configuration A, versus sorbent temperature profiles in accordance with conventional standalone ACRUs being developed.

FIG. 11 shows the sorbent temperature profiles for configuration A and the standalone burner and ACRU systems. Inventive configuration A produces a temperature profile that resembles the 200° F. preheat case (standalone) near the beginning of the cycle, and a final heating rate that resembles the standalone system with the 30 KW water heater. The sorbent reaches its setpoint faster in the integrated system than the 200° F. stand-alone preheat case because of the continued heat transfer from the air stream through HX2.

FIG. 22 demonstrates that the integrated system, inventive configuration A, generates less total waste-heat than any of the standalone scenarios considered. These cases were compared because they have the most similar sorbent temperature profiles. In the preheat case, there is a heat loss due to the heat reservoir, as described hereinabove. In inventive configuration A, there is an associated heat loss from HX2 (1.10 MJ) with the total amount of heat loss proportional to the area under the temperature profile (FIG. 10). The $T_{17}$ heat is analogous to the heat load on AC system heat in FIG. 19. All heat generated in the integrated systems eventually becomes waste-heat on the submarine.

Figure 12:
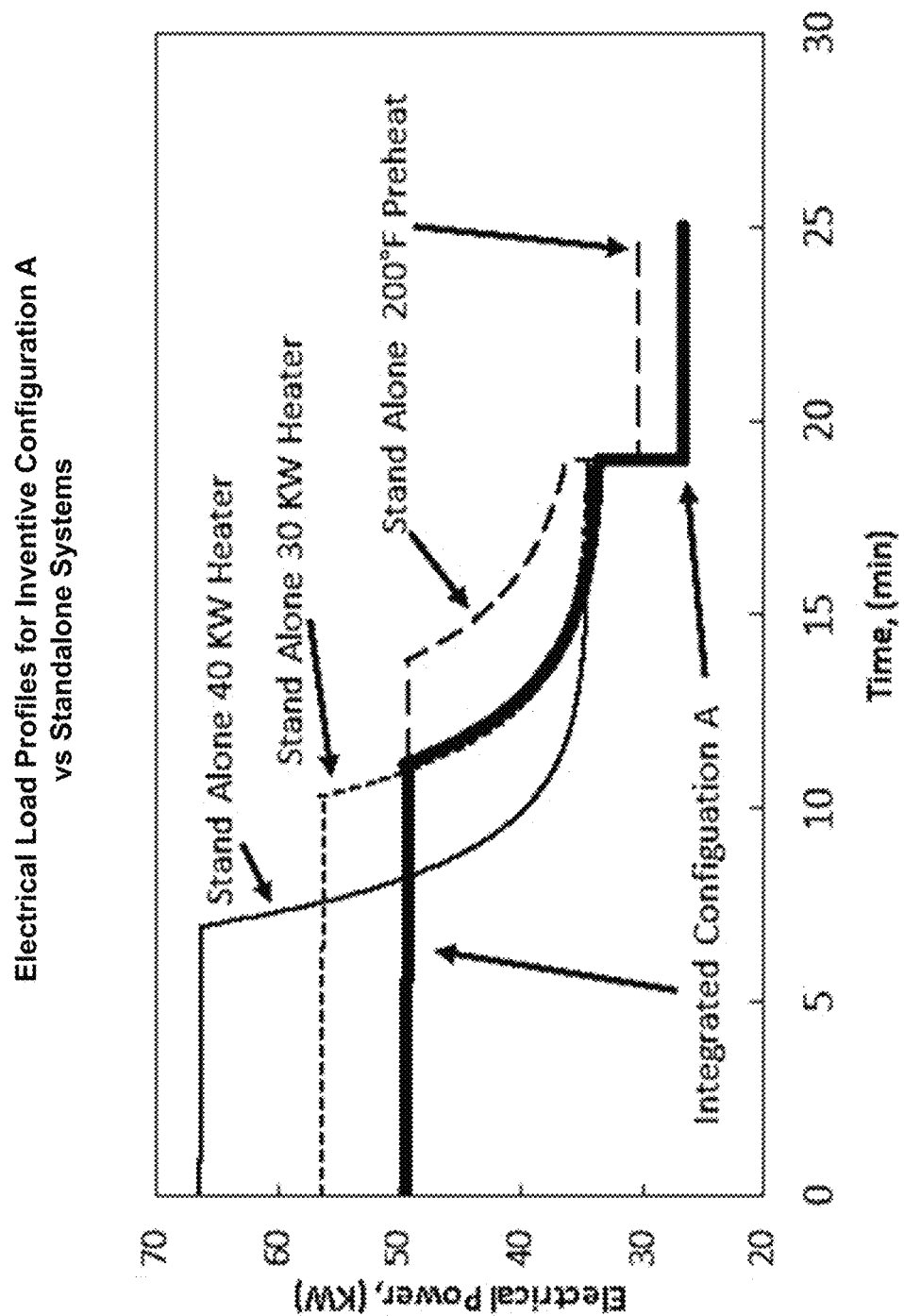
FIG. 12 is a graph illustrating, by way of example, electrical load profiles in accordance with inventive configuration A, versus electrical load profiles in accordance with conventional standalone ACRUs being developed.

FIG. 12 shows the electrical load profiles for inventive configuration A versus the standalone systems. The inventive integrated system and the 200° F. preheat case have the lowest loads at the beginning of the regeneration cycle. The integrated system and the higher water heat power cases (30 KW and 40 KW) have the lowest load at the end of the cycle. Therefore, at the beginning and end of the cycle, the inventive integrated system has the lowest electrical load. The 40 KW water heater case has a lower load in the middle of the regeneration cycle but a very high load at the beginning of the cycle. Overall, integration according to inventive configuration A provides the preferred electrical load profile.

Inventive Configuration B

Reference is now made to FIGS. 13 through 18, 23, and 24. As illustrated in FIG. 13, air is taken in from the environment via air inlet IN1 by catalytic component 1000. This ambient air taken in by catalytic component 1000 is heated by first heat exchanger HX1, conducted to air heater HTR1, conducted to and catalyzed by catalyst CAT, and conducted to second heat exchanger HX2. The catalyzed air that is conducted to second heat exchanger HX2 is conducted to first heat exchanger HX1, conducted to aftercooler AC, and released into the atmosphere. In addition, air is taken in from the environment by heat-producing temperature-swing adsorption-desorption component 2000. This ambient air taken in by adsorption-desorption component 2000 enters sorbent SB via air inlet IN2, passes through sorbent SB, and exits sorbent SB via air outlet OUT2. Second heat exchanger HX2 acts as a heat reservoir in sorbent water loop SB.

FIG. 13 shows an embodiment of an integrated catalyst burner/ACRU system in accordance with configuration B of the present invention. As shown in FIG. 13, all of the catalyzed air is conducted from the second heat exchanger HX2 to the first heat exchanger HX1 and then to the aftercooler AC. In comparison to inventive configuration A, inventive configuration B is better suited for decreasing the duration of the regeneration cycle. Integration according to inventive configuration A generates less waste-heat and has favorable electrical load characteristics relative to the stand-alone systems. However, the sorbent temperature profile for inventive configuration A does not allow the regeneration cycle to be shortened. In these cases, the sorbent does not heat fast enough to permit a significantly reduced desorption time.

Sorbent temperature profiles resembling the standalone 100 KW water heater or the 500° F. level of preheat are necessary in order to obtain rapid heating rates and reduced regeneration cycle time. According to either inventive configuration A or inventive configuration B, second heat exchanger HX2 acts like the heat reservoir. If the catalytic burner and the ACRU are integrated according to inventive configuration A, such as shown in FIG. 9, HX2 acts like the heat reservoir with a preheat temperature $T_5$ of 191° F. If the catalytic burner and the ACRU are integrated according to inventive configuration B, such as shown in FIG. 13, HX2 acts like the heat reservoir with a preheat temperature $T_4$ of 485° F.

Notable temperature relationships for inventive configuration A (designated herein temperature relationship "A") are as follows:

$$T_2-T_1 \approx T_4-T_5 \approx 294° F.$$

Notable temperature relationships for inventive configuration B (designated herein temperature relationship "B") are as follows:

$$T_2-T_1 \approx T_{15}-T_{16} > 0° F.$$

Both temperature relationship A and temperature relationship B are consequences of the fundamental laws of Conservation of Energy, and hence are always "true." Generally speaking, minor variation from these fundamental laws would be expected in an inventive system due to heat losses from the first heat exchanger, and variation of the heat capacity of air with changing temperature. In temperature relationship A, all values are constant. In temperature relationship B, only $T_1$ is constant; $T_2$, $T_{15}$, and $T_{16}$ vary.

Figure 14:
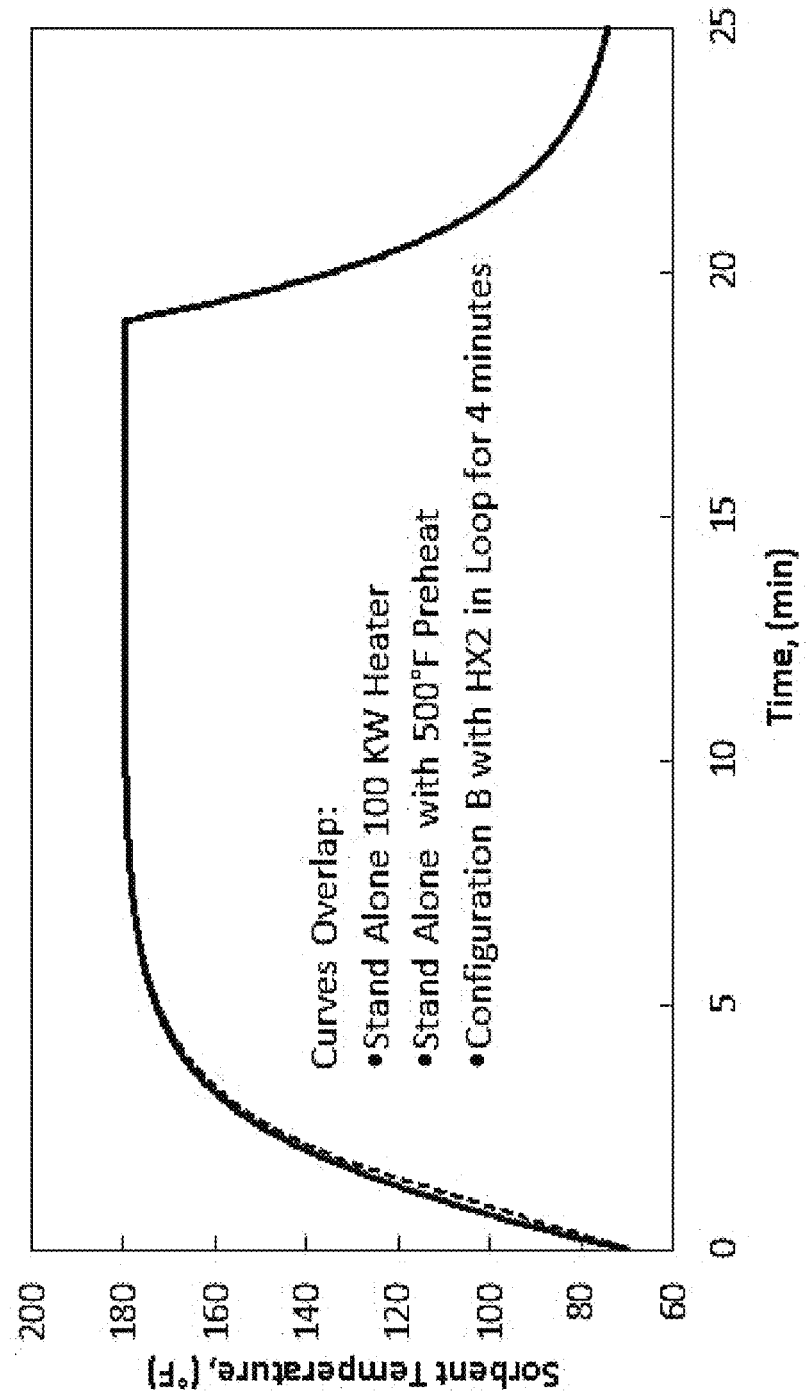
FIG. 14 is a graph illustrating, by way of example, sorbent temperature profiles in accordance with inventive configuration B, versus sorbent temperature profiles in accordance with conventional standalone ACRUs being developed.

FIG. 14 shows that the sorbent temperature profiles overlap for the standalone 100 KW water heater case (no preheat), the standalone 500° F. preheat case, and integrated case according to configuration B. The performance of the sorbent would be the same in each of these scenarios.

Figure 15:
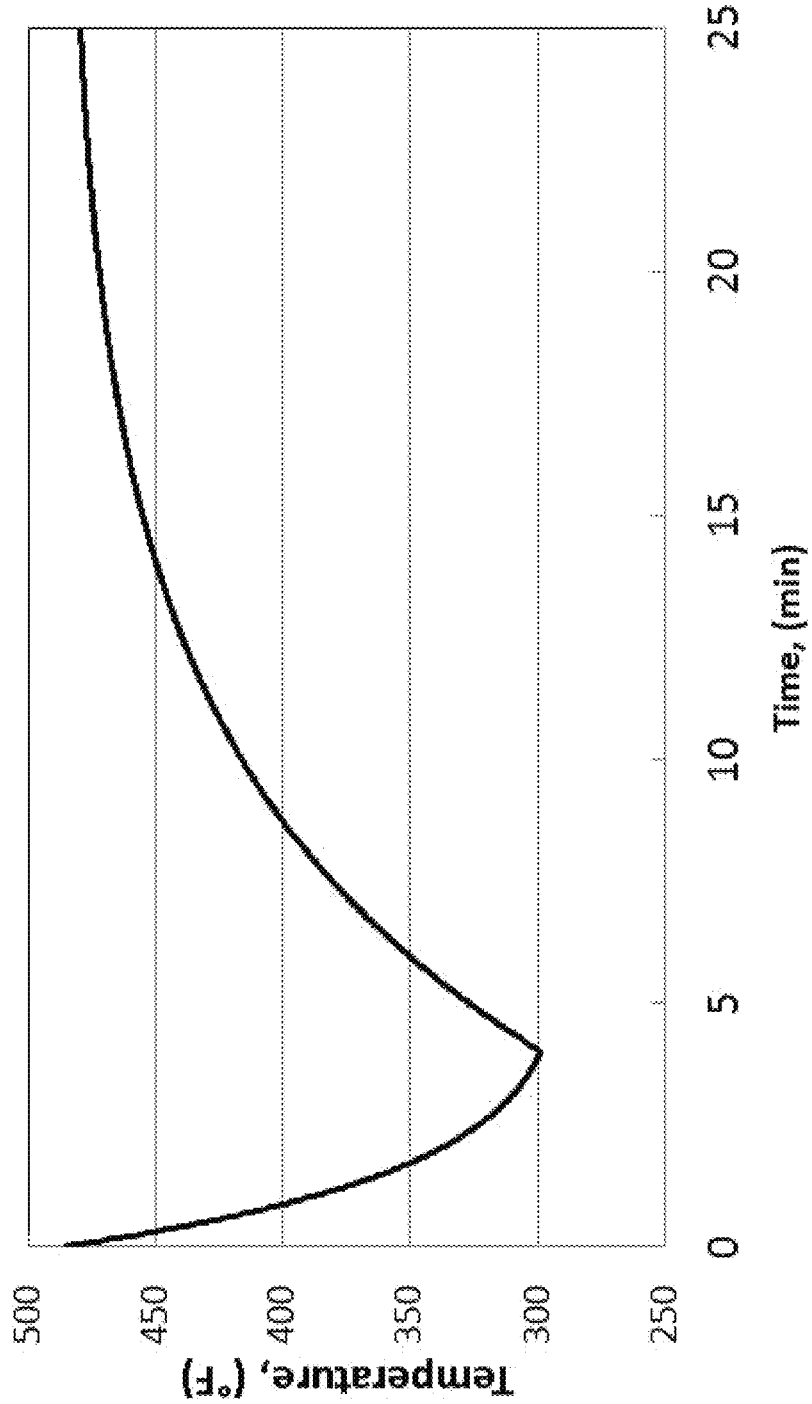
FIG. 15 is a graph illustrating, by way of example, a temperature profile of the second heat exchanger (HX2) in accordance with inventive configuration B.

The heat balance comparison of FIG. 23 shows that the integrated system generates the least amount of waste-heat. The differences are smaller than from configuration A, however, because the heat transferred to the ACRU in configuration B is not "free". Any heat transferred to the ACRU will lower the temperature of $T_{15}$ in FIG. 13 and must be made up by the burner heater (HTR1). The water was diverted around HX2 starting at the 4 minute point in configuration B because heat from the burner is no longer needed at that point. The temperature profile for heat exchanger HX2 is shown in FIG. 15.

Figure 16:
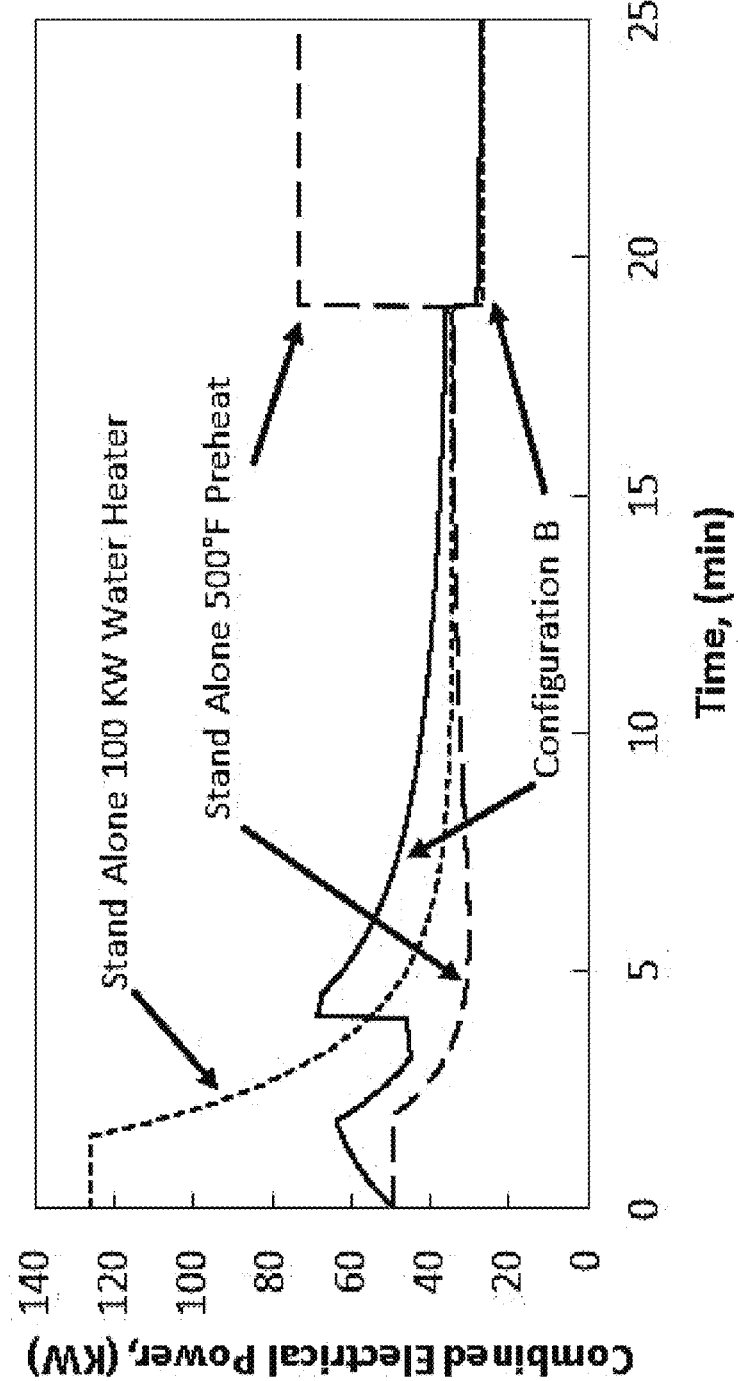
FIG. 16 is a graph illustrating, by way of example, electrical load profiles in accordance with inventive configuration B, versus electrical load profiles in accordance with conventional standalone ACRUs being developed.

FIG. 16 shows the electrical load profiles for configuration B versus the stand-alone systems. The stand-alone systems with the 100 KW water heater has a very high power load at the beginning of the regeneration cycle, and the stand-alone 500° F. preheat has the highest power requirement at the end of the cycle. Configuration B has the lowest overall electrical power requirement and the shortest duration of peak power.

Figure 17:
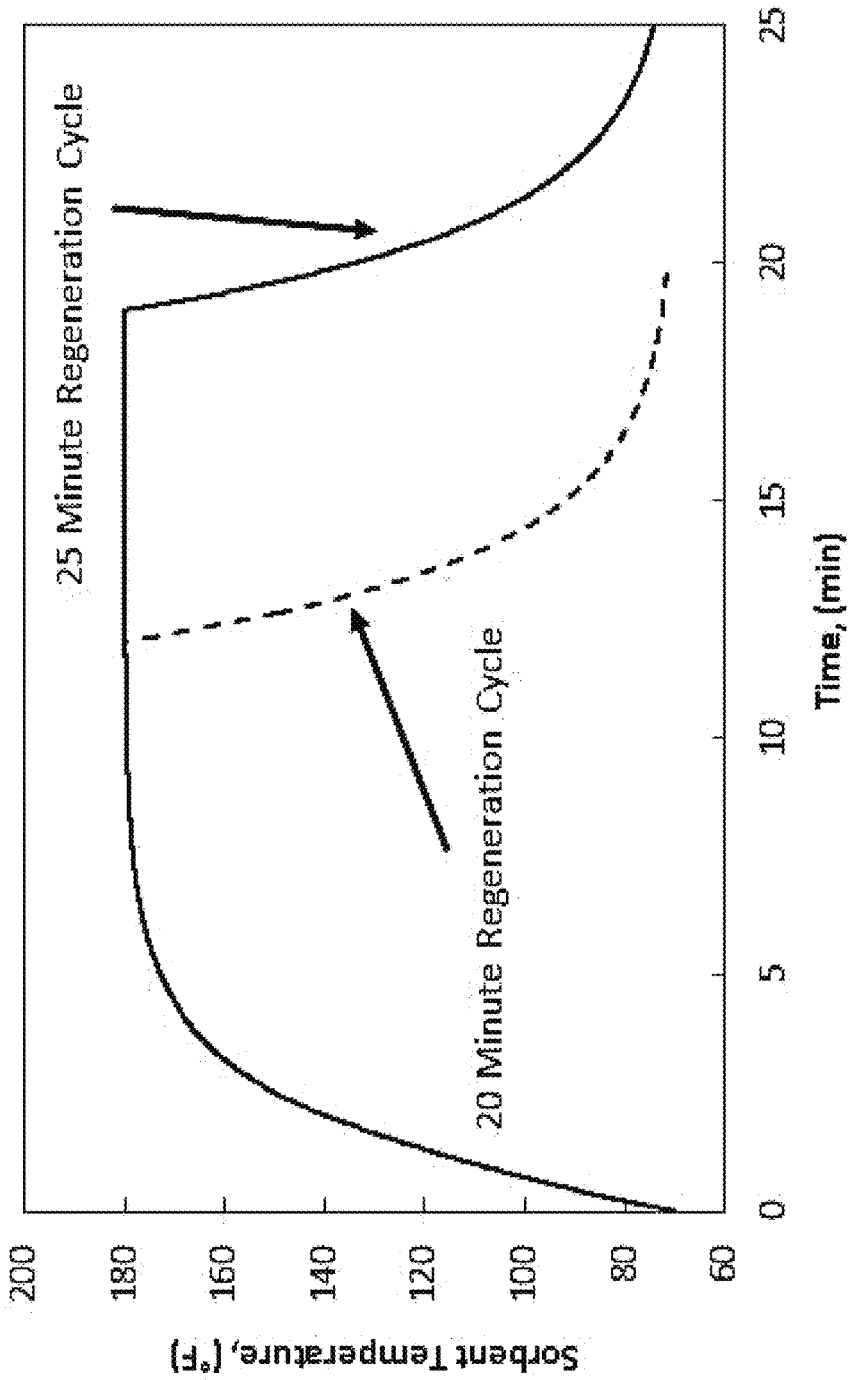
FIG. 17 is a graph illustrating, by way of example, regeneration cycles that are shortened in accordance with inventive practice and particularly in accordance with inventive configuration B.
Figure 18:
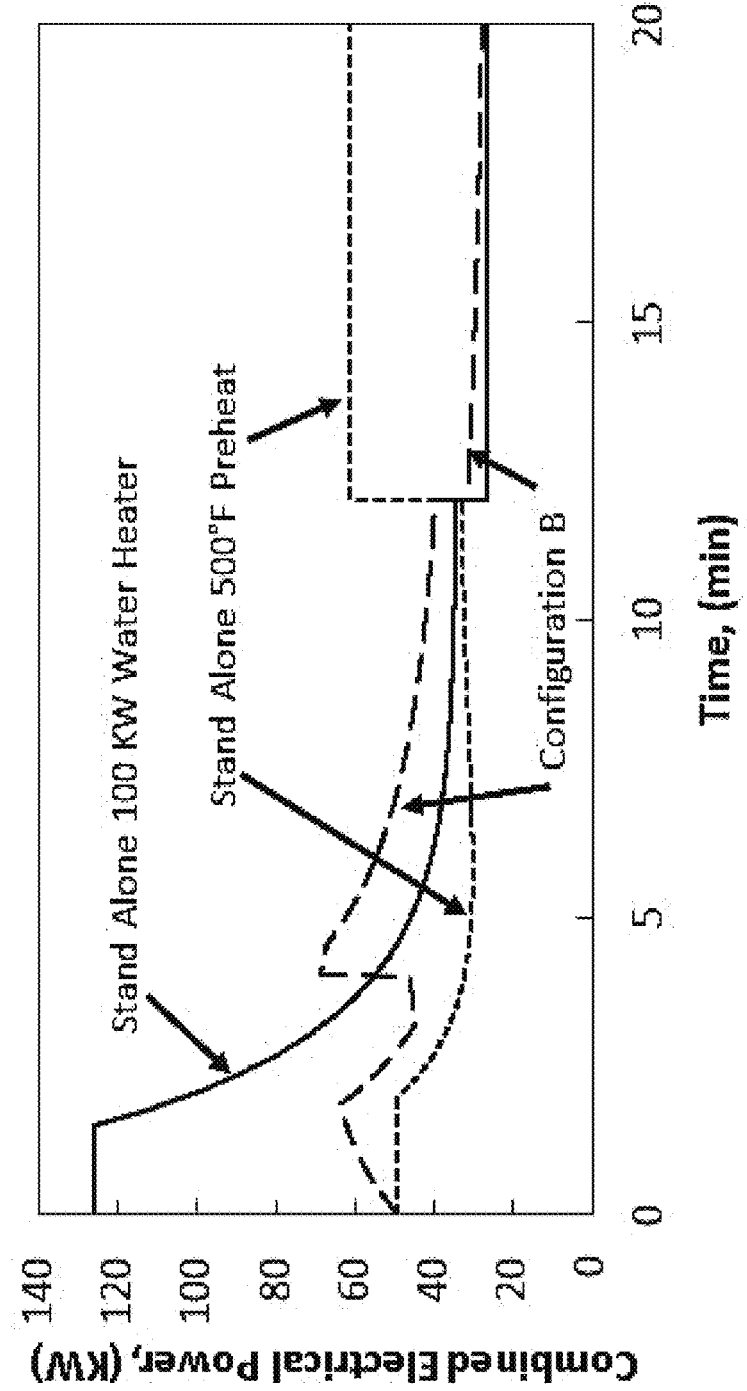
FIG. 18 is a graph illustrating, by way of example, electrical load profiles in accordance with inventive configuration B, versus electrical load profiles in accordance with conventional standalone ACRUs being developed, wherein the regeneration cycles shown in FIG. 18 are shorter than the regeneration cycles shown in FIG. 16.

Inventive practice may feature shortening of the regeneration cycle. FIG. 17 shows that, in accordance with some embodiments of the present invention, high sorbent heating rates may allow the regeneration cycle to be shortened. This could increase the removal capacity of the sorbent system by allowing the sorbent to be cycled faster. The shortened cycle maintains the desorption temperature for ~3 minutes and allows the cool-down to begin at the 12 minute point. The duration of the regeneration cycle is reduced to 20 minutes. The sorbent temperature profiles for the stand-alone systems and configuration B overlap and appear like the 20 minute curve in FIG. 17.

FIG. 24 shows that configuration B generates the least amount of waste-heat for the 20 minute regeneration cycle. Cycling at the higher rate generates less waste-heat per cycle but slightly higher average waste-heat power.

FIG. 18 shows again that the stand-alone 100 KW water heater case has a very high electrical power load at the beginning of the cycle. The stand-alone 500 F preheat case has the lowest maximum power requirement, but the maximum power (61 KW) is required for a long period of time (8 minutes). The integrated system, Configuration B, has the shortest duration of maximum power (above 61 KW for less than 1.5 minutes) and a brief peak power of 69 KW. The integrated system has the most favorable electrical load profile because heating of the electrical distribution system is related to the power levels and the duration of power draw.

Inventive Configuration C

Figure 25:
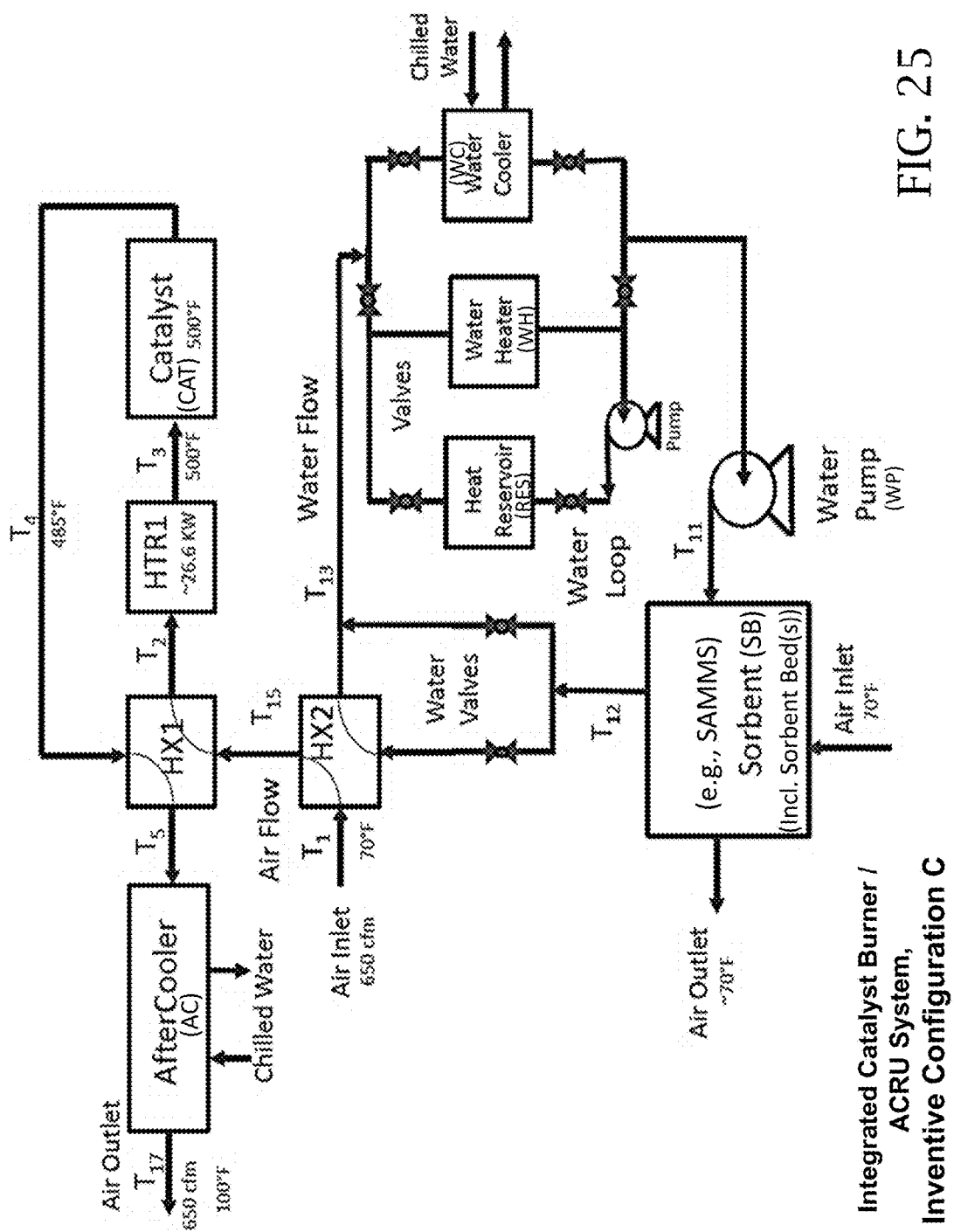
FIG. 25 is a block diagram illustrating, by way of example, practice of configuration "C" in accordance with the present invention.

FIG. 25 shows an embodiment of an integrated catalyst burner/ACRU system in accordance with configuration C of the present invention. A net transfer of heat occurs from the ACRU to the catalyst burner, during sorbent cool-down. Heat exchanger HX2 does not act as a thermal reservoir, since the majority of the heat transferred into heat exchanger HX2 during the sorbent cool down period is immediately transferred into the catalytic burner system. Inventive configuration C may succeed in saving some energy, but usually not a great amount of energy. For instance, only about 0.5 MJ over a 25 minute period will be saved according to exemplary practice of inventive configuration C. As distinguished from inventive configurations A and B, in inventive configuration C heat is transferred from the sorbent component 2000 to the catalyst component 1000 during sorbent cool-down, and heat exchanger HS2 does not act as a heat reservoir.

Inventive integration of separate electromechanical systems can afford numerous benefits. Inventive practice is particularly useful when a catalytic system and a temperature swing adsorption system must operate in a situation in which there is a need to minimize the power and total energy consumed. Generally speaking, it is desirable to maximize the performance of a temperature-swing adsorption system during the design phase. Selection of inventive configuration A versus inventive configuration B may depend on the expected or projected performance of the temperature-swing adsorption system.

For instance, if the adsorptive capacity of the available sorbent allows the standalone ACRU to meet all design requirements, there will be no requirement to improve the sorbent performance, and the individual systems (catalytic burner system and ACRU system) should be integrated according to inventive configuration A. This would reduce the total waste-heat generated on the submarine and optimize the electrical load profile.

On the other hand, integration of the individual systems (catalytic burner system and ACRU system) according to inventive configuration B may be desirable. If the regeneration efficiency of the sorbent must be improved, the individual systems (catalytic burner system and ACRU system) should be integrated according to inventive configuration B with a 25 minute regeneration cycle. If the available sorbent does not have sufficient capacity for a 25 minute adsorption cycle, the sorbent must be cycled faster to achieve higher $CO_2$ removal capacities and sorbent reserve capacity, and the systems should be integrated according to invention configuration B with a shortened regeneration cycle. In both cases, configuration B offers improved electrical load profiles and a reduction in the total amount of energy consumed and waste-heat generated.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A thermally active electromechanical system comprising:
   a heat-producing catalytic component, said catalytic component including a first heat exchanger and a catalyst;
   a heat-producing temperature-swing adsorption-desorption component, said adsorption-desorption component including a sorbent device and being characterized by a sorbent water loop for alternately heating and cooling said sorbent, said sorbent being cycled between a lower temperature for adsorption and a higher temperature for desorption;
   a second heat exchanger, said second heat exchanger being associated with said heat-producing catalytic component and with said temperature-swing adsorption-desorption component;
   wherein air that is taken in from an ambience is conducted from said first heat exchanger to a catalyst, catalyzed by said catalyst, conducted from said catalyst to said second heat exchanger, and conducted from said second heat exchanger to said first heat exchanger;
   wherein said second heat exchanger acts as a heat reservoir in said sorbent water loop.

2. The thermally active electromechanical system of claim 1, further comprising:
   an aftercooler;
   a first air inlet, for airflow into said first heat exchanger;
   a first air outlet, for airflow out of said aftercooler;
   a second air inlet, for airflow into said sorbent;
   a second air outlet, for airflow out of said sorbent;
   wherein said air that is conducted from said second heat exchanger to said first heat exchanger is conducted from said first heat exchanger to said aftercooler.

3. The thermally active electromechanical system of claim 2, wherein:
   each of said first air inlet and said second air inlet is for air intake from said ambience;
   each of said first air outlet and said second air outlet is for air release into said ambience.

4. The thermally active electromechanical system of claim 1, wherein:
   said thermally active electromechanical system is an air contaminant removal system;
   said catalytic component is capable of removing at least one contaminant including carbon monoxide;
   said adsorption-desorption component is capable of removing at least one contaminant including carbon dioxide.

5. The thermally active electromechanical system of claim 1, wherein said air that is taken in from said ambience is heated by said first heat exchanger prior to said air being conducted to said catalyst.

6. The thermally active electromechanical system of claim 5, wherein said catalytic component further includes an air heater for further heating said air that is taken in from said ambience and heated by said first heat exchanger, said air heater further heating said air prior to said air being conducted to said catalyst.

7. The thermally active electromechanical system of claim 1, further comprising an aftercooler, wherein said air that is conducted from said second heat exchanger to said first heat exchanger is conducted from said first heat exchanger to said aftercooler.

* * * * *